United States Patent
Franklin et al.

(10) Patent No.: US 10,606,642 B1
(45) Date of Patent: Mar. 31, 2020

(54) DYNAMIC POWER BUDGETS

(71) Applicant: Amazon Technologies, Inc., Reno, NV (US)

(72) Inventors: Paul David Franklin, Seattle, WA (US); Colin Laird Lazier, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/488,133

(22) Filed: Sep. 16, 2014

(51) Int. Cl.
*G06F 9/48* (2006.01)
*G06F 1/26* (2006.01)
*G06F 1/329* (2019.01)

(52) U.S. Cl.
CPC ............ *G06F 9/4893* (2013.01); *G06F 1/26* (2013.01); *G06F 1/329* (2013.01)

(58) Field of Classification Search
CPC .............................. G06F 9/4893; G06F 1/329
USPC ........................................................ 713/300
See application file for complete search history.

(56) References Cited

U.S. PATENT DOCUMENTS

| | | | |
|---|---|---|---|
| 8,224,993 B1 * | 7/2012 | Brandwine | G06F 1/3203 709/244 |
| 8,400,893 B2 | 3/2013 | Takada et al. | |
| 9,229,507 B1 * | 1/2016 | Hennecke | G06F 1/26 |
| 2007/0067657 A1 | 3/2007 | Ranganathan et al. | |
| 2007/0186121 A1 * | 8/2007 | Yasuo | G06F 1/3203 713/320 |
| 2008/0184044 A1 | 7/2008 | Leech et al. | |
| 2009/0006733 A1 | 1/2009 | Gold et al. | |
| 2009/0113221 A1 * | 4/2009 | Holle | G06F 1/189 713/310 |
| 2011/0016342 A1 * | 1/2011 | Rowan | G06F 11/3006 713/340 |
| 2011/0239010 A1 * | 9/2011 | Jain | G06F 1/3209 713/310 |
| 2012/0036377 A1 * | 2/2012 | Tolentino | G06F 1/266 713/310 |
| 2014/0047040 A1 | 2/2014 | Patiejunas et al. | |
| 2014/0075222 A1 * | 3/2014 | Jackson | G06F 1/329 713/320 |
| 2014/0281345 A1 * | 9/2014 | Li | G06F 9/5016 711/171 |
| 2015/0046685 A1 * | 2/2015 | Park | G06F 1/3243 712/220 |

* cited by examiner

*Primary Examiner* — Jaweed A Abbaszadeh
*Assistant Examiner* — Sumil M Desai
(74) *Attorney, Agent, or Firm* — Davis Wright Tremaine LLP

(57) ABSTRACT

A system and method for dynamically implementing a resource budget based at least in part on receiving information that prompts a determination of whether to adjust a maximum amount of resources available for utilization at least in part by data storage operations. As a result of the determination, the system and method produce, based at least in part on the information, a resource budget that reflects an adjustment to the maximum amount of resources available for utilization at least in part by the data storage operations, and implements the resource budget such that performance of the data storage operations is adjusted in accordance with the adjustment to the maximum amount of resources available for utilization.

21 Claims, 12 Drawing Sheets

DYNAMIC POWER BUDGETS

CROSS REFERENCE TO RELATED APPLICATION

This application incorporates by reference for all purposes the full disclosure of co-pending U.S. patent application Ser. No. 14/488,128, filed concurrently herewith, entitled "POWER-BASED WORK SCHEDULING."

BACKGROUND

In modern computer systems, a non-trivial percentage of the total cost of ownership of a computer system corresponds to the amount of power it consumes. As an example, rack position cost for some equipment can comprise a substantial portion of the overall cost of the system; much of it is attributed to the cost of hardware necessary to distribute power to the racks and to provide cooling for the racks. In highly cost-optimized systems, such as archival storage systems, these power-related costs can be a significant percentage of the total cost of ownership of the systems, and an aggregate maximum power utilization across all racks generally determines the size and cost of the power distribution and cooling equipment for the facility. These hardware costs are often either shared equally among the racks for ease of accounting purposes or allocated proportionally, based on expected maximum power utilization. However, because power utilization varies widely based on various factors, such as hard disk drive activity and temperature, allocating hardware based on an average or expected maximum power utilization is an inefficient and uneconomical use of resources.

BRIEF DESCRIPTION OF THE DRAWINGS

Various embodiments in accordance with the present disclosure will be described with reference to the drawings, in which.

DETAILED DESCRIPTION

Figure 1:
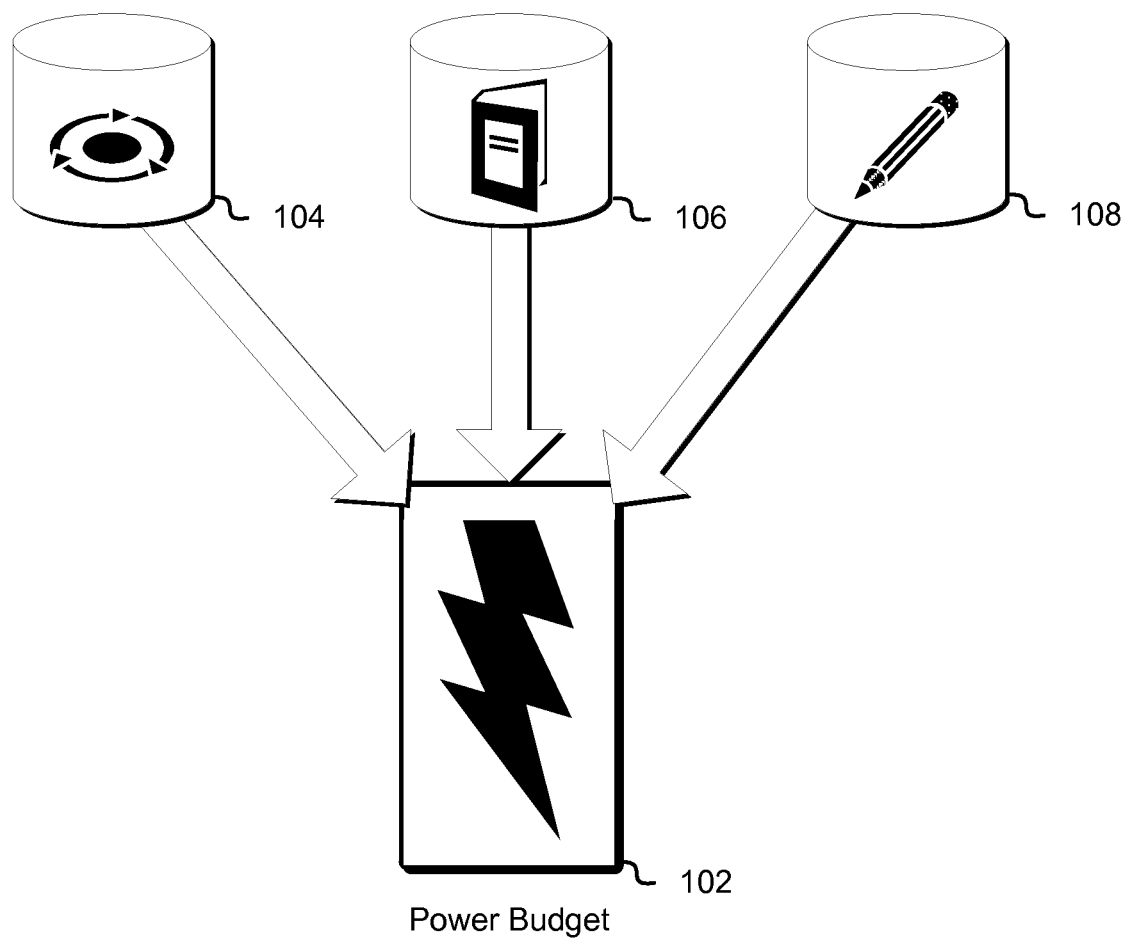
FIG. 1 illustrates an example of a resource budget that is influenced by various hard drive operations in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include managing power utilization of a computer system by scheduling hard disk activities based on the power utilization of each type of hard disk activity. Techniques described and suggested further include managing peak power utilization by providing an adjustable, programmatically assigned resource budget based on a prioritization scheme. The described and suggested techniques improve efficiency of computer systems by maximizing the number of batch processing jobs that may be performed within a particular resource budget. The described and suggested techniques additionally improve the field of electrical engineering infrastructure design by allowing computer systems within the infrastructure to make optimal use of available power in the infrastructure, thereby minimizing waste. Moreover, the described and suggested techniques offer significant advantages to existing power management methods for distributed computing systems by providing a fine-grained process of power management of rack positions, and allowing storage systems to postpone operations during times of peak resource demand and take advantage of periods of low resource demand.

In the embodiments of the present disclosure, equipment may have associated resource budgets. The resource budget may be implemented with a process for determining what activities may be performed within the resource budget. As an example, equipment racks in a data center for an archival storage service may have associated resource budgets of, say two kilovolt-amperes (KVA). These equipment racks may contain a series of hard drive arrays of a distributed data storage system used for archiving and retrieving data by the archival storage service, and each hard drive in the hard drive array may consume differing amounts of power for different operations. That is, random read operations may consume a certain amount of power, sequential write operations may consume a different amount of power, hard drives sitting idle may consume a still different amount of power, and hard drives in standby mode may consume even different amounts of power. By calculating the amount of power required to perform certain types of batch jobs in the archival storage job queue, and, based on resource budget and the present power utilization of a rack, a datacenter level scheduler may determine which, if any, of the jobs in the job queue may be scheduled without exceeding the resource budget. In some examples, a "distributed data storage system" may refer to a system that distributes data among a set of hard drives or other persistent storage medium.

In additional or alternative embodiments, the resource budget may be changed as needed. For example, a rack of an archival storage service in a data center may have a default resource budget of 2KVA. However, certain other racks in the data center, such as racks associated with a virtual computer system service, may have a need for additional power. Rather than installing additional power whips and racks to serve the racks with the additional power needs, cost savings may be achieved by reducing the archival storage service racks by a certain amount, such as by 1KVA, for the period needed by the racks with the additional power needs. In this way, the overall power utilization of the computing resource service provider need not increase, and data center space and equipment costs are conserved. The resource budget of this embodiment may be changed manually or may change automatically when certain conditions are fulfilled. The resource budget of this embodiment may also change in response to other factors, such as in response to outside temperature falling above or below a certain threshold.

FIG. 1 is a representation of how a resource budget of a computer system may be driven by various hard disk drive operations. Specifically, FIG. 1 depicts a resource budget 102 that, among other things, encompasses the power needs of spin up operations 104, read operations 106, and write operations 108 of hard drives, such as in drive racks of a data store of a data storage service of a computing resource service provider. The resource budget 102 represents the maximum allowable power utilization (i.e., power consumption) available for performing the disk operations 104-106. In some embodiments, the resource budget 102 may be a fixed value allocated to one or more racks or drives, while in other embodiments, the resource budget 102 may be a dynamically adjustable budget that changes according to various factors, which are described below in greater detail.

Figure 2:
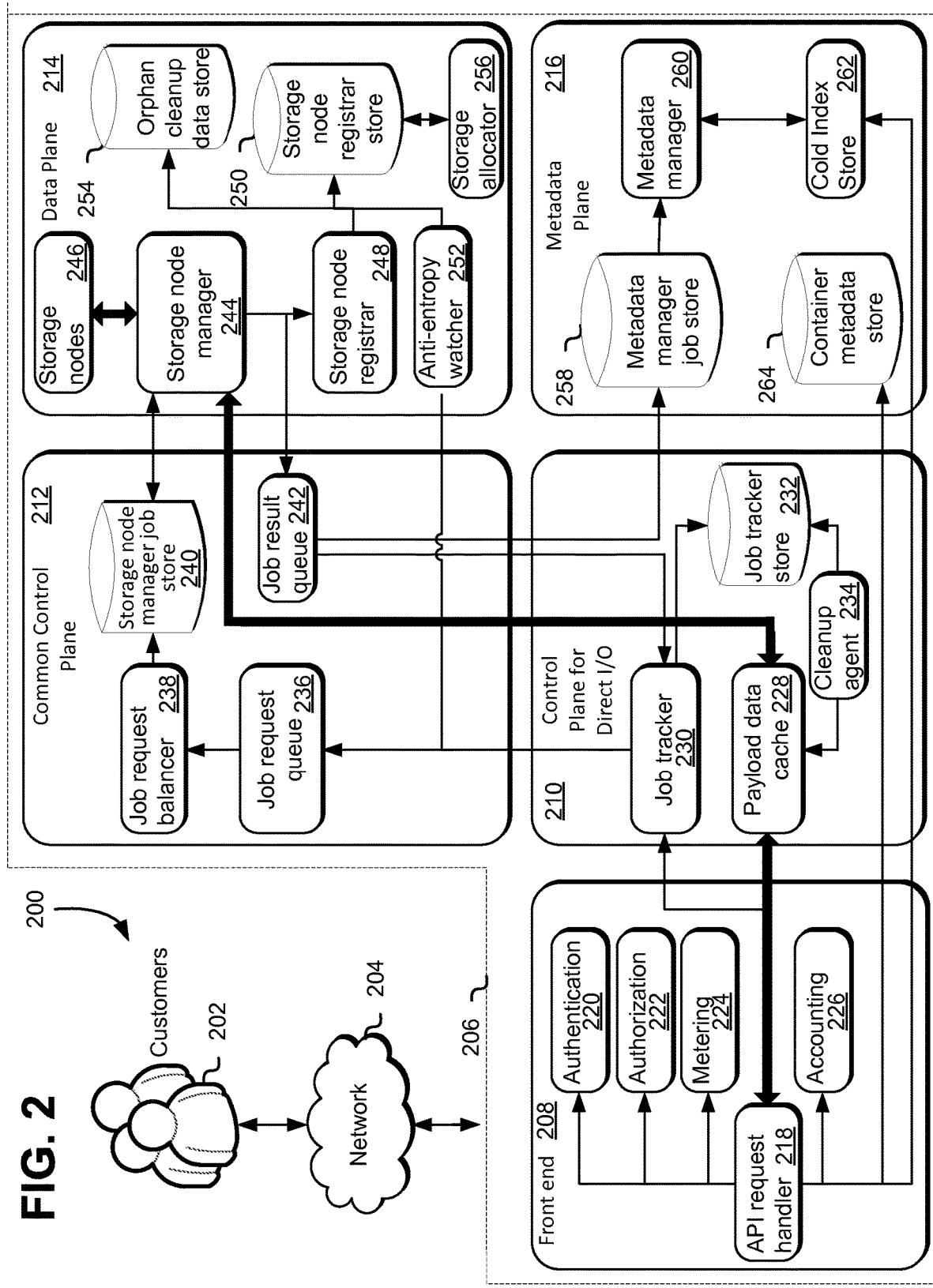
FIG. 2 illustrates an example environment in which archival data storage services may be implemented, in accordance with at least one embodiment.

A rack is an enclosure for mounting equipment modules, such as arrays of hard disk drives for storage, such as may be used in an archival data storage system 206 described in FIG. 2. Power to a rack position may be supplied by a power drop, such as a whip extension cable. For example, each rack may have its power supplied by two power whips, each capable of supplying 2.5KVA, for a maximum of 5KVA per rack. In some cases, a rack holder (e.g., an entity having ownership of the data or equipment in a rack), may be charged for the rack position based on the maximum KVA per rack or a determined peak power draw of the rack equipment; for example, upon startup (presuming the power draw peaks on startup), the initial power draw of the rack may be measured, and a rack holder may be charged on that basis. In this example, the average power utilization of the rack may be 1.3KVA, but the maximum 5KVA capacity allows for surges in power utilization by the rack equipment, such as from a boot up operation that spins up all the hard drives simultaneously. Thus, in some other cases it may be advantageous to charge for rack position based on average or actual power utilization.

Thus, it may be that setting a resource budget as described in the present disclosure provides for more efficient power management and cost savings. A resource budget in this context represents the maximum amount power that a rack is permitted to consume. In an example where the average rack position consumes an average of 1.3KVA, the rack holder may request a resource budget of 2KVA. A datacenter level scheduler (e.g., power management system) may then be implemented to ensure that the operations of the equipment (e.g., hard drives mounted in the rack, etc.) do not exceed the resource budget. As an example, it may be known that certain activities, such as reading data from a hard drive, consume less power than other activities, such as writing to the hard drive. In this example, the datacenter level scheduler may be able to determine that, in order to remain within the resource budget, a maximum of 20% of the hard drives may be concurrently active at one time, if they are performing write operations, but for read operations, up to 30% of the hard drives may be simultaneously active. The datacenter level scheduler may also consider the difference in power requirements of sequential operations versus random operations for different types of hard drives for more fine-grained power management. For example, up to 30% of drives in a rack may be active if performing random read operations, but up to 40% of the drives may be active if performing sequential read operations.

With the knowledge of the resource budget and the power utilization requirements of the different activities for the drives within the rack, batch processing of read and write jobs may be scheduled in such a way as to ensure that power utilization remains at or below the resource budget. That is, asynchronous data storage services, such as the archival data storage system 206 described in FIG. 2, may be able to reprioritize batch jobs in the queue in order to remain within the resource budget.

Note that the resource budget of this disclosure may comprise more than a maximum power value. The resource budget may actually be a series of rules and may be based on factors other than direct power utilization. For example, the resource budget may have rules specifying that no more than 10% of the drives in the rack may be simultaneously reading and no more than 5% of the drives in the rack may be simultaneously writing. The resource budget may also be responsive to specified conditions; e.g., certain resource budget rules may be applied when the ambient temperature of the rack is at or below a certain temperature, whereas a different set of rules may apply if the ambient temperature of the rack rises above a certain temperature.

Similarly, although the resource budget has been described in terms of power utilization of a rack position, the present disclosure also contemplates finer-grained resource budgets. For example, in some embodiments, resource budgets may alternatively or additionally be applied separately to each system (e.g., server, drive array, etc.) mounted in the rack. Likewise, resource budgets may be set for a collection of racks. As an example of this, a resource budget may be set to allow only 30% of disks in a collection of racks to be spinning at a time. If the collection of racks comprises three racks, it may be that one rack could have 80% of drives spinning while the other two racks each have only 5% of drives spinning, with the collection of racks still remaining within the resource budget (i.e., (80%+5%+5%)÷3=30%).

In some cases, the power utilization may be a result of a calculation using the known operating characteristics of the equipment (e.g., power requirement for different types of jobs, such as those involving sequential reads, standby mode, etc.) within the rack and the operations being performed or scheduled to be performed. In other cases, the real-time power utilization may be measured directly (such as by an energy meter, wattmeter, or similar instrument interfaced with the datacenter level scheduler server). For instance, the present power draw may be obtained, through a measurement or calculation, and the datacenter level scheduler may determine that there is 0.3KVA of resource budget remaining that could be allocated to perform certain operations. In such a case, the management may examine its job queue to determine if or which operations may be scheduled in order to maximize the use of the resource budget. Scheduling jobs in this manner provides a benefit by making the most efficient usage of the power available.

FIG. 2 illustrates an example environment 200 in which an archival data storage system may be implemented, in accordance with an embodiment. One or more customers 202 connect, via a network 204, to an archival data storage system 206. As implied above, unless otherwise clear from context, the term "customer" refers to the system(s) of a customer entity (such as an individual, company or other organization) that utilizes data storage services described. Such systems may include data centers, mainframes, individual computing devices, distributed computing environments and customer-accessible instances thereof or any other system capable of communicating with the archival data storage system. In some cases, a customer may refer to a machine instance (e.g., with direct hardware access) or virtual instance of a distributed computing system provided by a computing resource provider that also provides the archival data storage system. In some cases, the archival data storage system is integral to the distributed computing system and may include or be implemented by an instance, virtual or machine, of the distributed computing system. In various embodiments, network 204 may include the Internet, a local area network ("LAN"), a wide area network ("WAN"), a cellular data network and/or other data network.

The archival data storage system 206 may provide a multi-tenant or multi-customer environment where each tenant or customer may store, retrieve, delete or otherwise manage data in a data storage space allocated to the customer. In some cases, an archival data storage system 206 comprises multiple subsystems or "planes," each of which provides a particular set of services or functionalities. For example, as illustrated in FIG. 2, archival data storage system 206 includes front end 208, control plane for direct I/O 210, common control plane 212, data plane 214 and metadata plane 216. Each subsystem or plane may comprise one or more components that collectively provide the particular set of functionalities. Each component may be implemented by one or more physical and/or logical computing devices, such as computers, data storage devices and the like. Components within each subsystem may communicate with components within the same subsystem, components in other subsystems or external entities such as customers. At least some of such interactions are indicated by arrows in FIG. 2. In particular, the main bulk data transfer paths in and out of archival data storage system 206 are denoted by bold arrows. It will be appreciated by those of ordinary skill in the art that various embodiments may have fewer or a greater number of systems, subsystems and/or subcomponents than are illustrated in FIG. 2. Thus, the depiction of environment 200 in FIG. 2 should be taken as being illustrative in nature and not limiting to the scope of the disclosure.

In the illustrative example, front end 208 implements a group of services that provides an interface between the archival data storage system 206 and external entities, such as one or more customers 202. The front end 208 may provide an application programming interface ("API") to enable a user to programmatically interface with the various features, components and capabilities of the archival data storage system. Such APIs may be part of a user interface that may include graphical user interfaces (GUIs), Web-based interfaces, programmatic interfaces such as application programming interfaces (APIs) and/or sets of remote procedure calls (RPCs) corresponding to interface elements, messaging interfaces in which the interface elements correspond to messages of a communication protocol, and/or suitable combinations thereof.

Capabilities provided by archival data storage system 206 may include data storage, data retrieval, data deletion, metadata operations, configuration of various operational parameters and the like. Metadata operations may include requests to retrieve catalogs of data stored for a particular customer, data recovery requests, job inquires and the like. Configuration APIs may allow customers to configure account information, audit logs, policies, notifications settings and the like. A customer may request the performance of any of the above operations by sending API requests to the archival data storage system. Similarly, the archival data storage system may provide responses to customer requests. Such requests and responses may be submitted over any suitable communications protocol, such as Hypertext Transfer Protocol ("HTTP"), File Transfer Protocol ("FTP") and the like, in any suitable format, such as REpresentational State Transfer ("REST"), Simple Object Access Protocol ("SOAP") and the like. The requests and responses may be encoded, for example, using Base64 encoding, encrypted with a cryptographic key or the like.

In some cases, archival data storage system 206 allows customers to create one or more logical structures such as a logical data containers in which to store one or more archival data objects. As used, data object is used broadly and does not necessarily imply any particular structure or relationship to other data. A data object may be, for instance, simply a sequence of bits. Typically, such logical data structures may be created to meeting certain business requirements of the customers and are independently of the physical organization of data stored in the archival data storage system. As used, the term "logical data container" refers to a grouping of data objects. For example, data objects created for a specific purpose or during a specific period of time may be stored in the same logical data container. Each logical data container may include nested data containers or data objects and may be associated with a set of policies such as size limit of the container, maximum number of data objects that may be stored in the container, expiration date, access control list and the like. In various implementations, logical data containers may be created, deleted or otherwise modified by customers via API requests, by a system administrator or by the data storage system, for example, based on configurable information. For example, the following HTTP PUT request may be used, as an example, to create a logical data container with name "logical-container-name" associated with a customer identified by an account identifier "accountId".

PUT /{accountId}/logical-container-name HTTP/1.1

The archival data storage system 206 may provide the APIs for customers to store data objects into logical data containers. The following HTTP POST request may be used, in an illustrative example, to store a data object into a given logical container. The request may specify the logical path of the storage location, data length, reference to the data payload, a digital digest of the data payload and other information. In one case, the APIs may allow a customer to upload multiple data objects to one or more logical data containers in one request. In another case where the data object is large, the APIs may allow a customer to upload the data object in multiple parts, each with a portion of the data object.

POST /={accountId}/logical-container-name/data HTTP/1.1
Content-Length: 1128192
x-ABC-data-description: "annual-result-2012.xls"
x-ABC-md5-tree-hash: 634d9a0688aff95c In response to a data storage request, the archival data storage system 206 may provide a data object identifier if the data object is stored successfully. Such data object identifier may be used to retrieve, delete or otherwise refer to the stored data object in subsequent requests. In some cases, such data object identifier may be "self-describing" in that it includes (for example, with or without encryption) storage location information that may be used by the archival data storage system to locate the data object without the need for additional data structures such as a global namespace key map. In addition, in some cases, data object identifiers may also encode other information such as payload digest, error-detection code, access control data and the other information that may be used to validate subsequent requests and data integrity. In some cases, the archival data storage system stores incoming data in a transient durable data store before moving it archival data storage. Thus, although customers may perceive that data is persisted durably at the moment when an upload request is completed, actual storage to a long-term persisted data store may not commence until sometime later (e.g., 12 hours later). In some cases, the timing of the actual storage may depend on the size of the data object, the system load during a diurnal cycle, configurable information such as a service-level agreement between a customer and a storage service provider and other factors.

In some cases, archival data storage system 206 provides the APIs for customers to retrieve data stored in the archival data storage system. In such a case, a customer may initiate a job to perform the data retrieval and may learn the completion of the job by a notification or by polling the system for the status of the job. As used, a "job" refers to a data-related activity corresponding to a customer request that may be performed temporally, independently from the time the request is received. For example, a job may include retrieving, storing and deleting data, retrieving metadata and the like. A job may be identified by a job identifier that may be unique, for example, among all the jobs for a particular customer. The following HTTP POST request may be used, in an illustrative example, to initiate a job to retrieve a data object identified by a data object identifier "dataObjectId." In other implementations, a data retrieval request may request the retrieval of multiple data objects, data objects associated with a logical data container and the like.

POST /{accountId}/logical-data-container-name/data/{dataObjectId} HTTP/1.1

In response to the request, the archival data storage system 206 may provide a job identifier job-id," that is assigned to the job in the following response. The response provides, in this example, a path to the storage location where the retrieved data will be stored.

HTTP/1.1 202 ACCEPTED
Location: /{accountId}/logical-data-container-name/jobs/{job-id}

At any given point in time, the archival data storage system may have many jobs pending for various data operations. In some cases, the archival data storage system may employ job planning and optimization techniques such as batch processing, load balancing, job coalescence and the like, to optimize system metrics such as cost, performance, scalability and the like. In some cases, the timing of the actual data retrieval depends on factors such as the size of the retrieved data, the system load and capacity, active status of storage devices and the like. For example, in some cases, at least some data storage devices in an archival data storage system may be activated or inactivated according to a power management schedule, for example, to reduce operational costs. Thus, retrieval of data stored in a currently active storage device (such as a rotating hard drive) may be faster than retrieval of data stored in a currently inactive storage device (such as a spun-down hard drive).

When a data retrieval job is completed, the retrieved data may be stored in a staging data store and made available for customer download. In some cases, a customer is notified of the change in status of a job by a configurable notification service. In other cases, a customer may learn of the status of a job by polling the system using a job identifier. The following HTTP GET request may be used, as an example, to download data that is retrieved by a job identified by "job-id," using a download path that has been previously provided.

GET /{accountId}/logical-data-container-name/jobs/{job-id}/output HTTP/1.1

In response to the GET request, in an illustrative example, archival data storage system 206 may provide the retrieved data in the following HTTP response, with a tree-hash of the data for verification purposes.

HTTP/1.1 200 OK
Content-Length: 1128192
x-ABC-archive-description: "retrieved stuff"
x-ABC-md5-tree-hash: 693d9a7838aff95c
[1112192 bytes of user data follows]

A customer may request the deletion of a data object stored in an archival data storage system by specifying a data object identifier associated with the data object. For example, in an illustrative example, a data object with data object identifier "dataObjectId" may be deleted using the following HTTP request. In another example, a customer may request the deletion of multiple data objects such as those associated with a particular logical data container.

DELETE /{accountId}/logical-data-container-name/data/{dataObjectId} HTTP/1.1

In various implementations, data objects may be deleted in response to a customer request or may be deleted automatically according to a user-specified or default expiration date. In some cases, data objects may be rendered inaccessible to customers upon an expiration time but remain recoverable during a grace period beyond the expiration time. In various implementations, the grace period may be based on configurable information such as customer configuration, service-level agreement terms and the like. In some cases, a customer may be provided the abilities to query or receive notifications for pending data deletions and/or cancel one or more of the pending data deletions. As one example, a customer may set up notification configurations associated with a logical data container such that the customer will receive notifications of certain events pertinent to the logical data container. Such events may include the completion of a data retrieval job request, the completion of metadata request, deletion of data objects or logical data containers and the like. As an example, archival data storage system 206 may also provide metadata APIs for retrieving and managing metadata such as metadata associated with logical data containers. In various implementations, such requests may be handled asynchronously (where results are returned later) or synchronously (where results are returned immediately).

Still referring to FIG. 2, in an example, at least some of the API requests discussed above are handled by API request handler 218 as part of front end 208. For example, API request handler 218 may decode and/or parse an incoming API request to extract information, such as uniform resource identifier ("URI"), requested action and associated parameters, identity information, data object identifiers and the like. In addition, API request handler 218 invoke other services (described below), where necessary, to further process the API request.

The front end 208 may include an authentication service 220 that may be invoked, for example, by API handler 218, to authenticate an API request. For example, in some cases, authentication service 220 may verify identity information submitted with the API request such as username and password Internet Protocol ("IP") address, cookies, digital certificate, digital signature and the like. In other cases, authentication service 220 may require the customer to provide additional information or perform additional steps to authenticate the request, such as required in a multifactor authentication scheme, under a challenge-response authentication protocol and the like.

The front end 208 may include an authorization service 222 that may be invoked, for example, by API handler 218, to determine whether a requested access is permitted according to one or more policies determined to be relevant to the request. As an example, authorization service 222 verifies that a requested access is directed to data objects contained in the requestor's own logical data containers or which the requester is otherwise authorized to access. In some cases, authorization service 222 or other services of front end 208 may check the validity and integrity of a data request based at least in part on information encoded in the request, such as validation information encoded by a data object identifier.

The front end 208 may include a metering service 224 that monitors service usage information for each customer such as data storage space used, number of data objects stored, data requests processed and the like. The front end 208 may also include an accounting service 226 that performs accounting and billing-related functionalities based, for example, on the metering information collected by the metering service 224, customer account information and the like. For example, a customer may be charged a fee based on the storage space used by the customer, size and number of the data objects, types and number of requests submitted, customer account type, service-level agreement the like.

The front end 208 batch may process some or all incoming requests. For example, the front end 208 may wait until a certain number of requests has been received before processing (e.g., authentication, authorization, accounting and the like) the requests. Such a batch processing of incoming requests may be used to gain efficiency.

In some implementations, the front end 208 may invoke services provided by other subsystems of the archival data storage system to further process an API request. For example, front end 208 may invoke services in metadata plane 216 to fulfill metadata requests. For another example, front end 208 may stream data in and out of control plane for direct I/O 210 for data storage and retrieval requests, respectively.

Referring now to control plane for direct I/O 210 illustrated in FIG. 2, in various implementations, control plane for direct I/O 210 provides services that create, track and manage jobs created as a result of customer requests. As discussed above, a job refers to a customer-initiated activity that may be performed asynchronously to the initiating request, such as data retrieval, storage, metadata queries or the like. The control plane for direct I/O 210 may include a job tracker 230 that is configured to create job records or entries corresponding to customer requests, such as those received from API request handler 218, and monitor the execution of the jobs. In various implementations, a job record may include information related to the execution of a job such as a customer account identifier, job identifier, data object identifier, reference to payload data cache 228 (described below), job status, data validation information and the like. In some cases, job tracker 230 may collect information necessary to construct a job record from multiple requests. For example, when a large amount of data is requested to be stored, data upload may be broken into multiple requests, each uploading a portion of the data. In such a case, job tracker 230 may maintain information to keep track of the upload status to ensure that all data parts have been received before a job record is created. In some cases, job tracker 230 also obtains a data object identifier associated with the data to be stored and provides the data object identifier, for example, to a front end service to be returned to a customer. Such data object identifier may be obtained from data plane 214 services such as storage node manager 244, storage node registrar 248, and the like, described below.

The control plane for direct I/O 210 may include a job tracker store 232 for storing job entries or records. In various implementations, job tracker store 232 may be implemented by a NoSQL data management system, such as a key-value data store, a relational database management system ("RDBMS") or any other data storage system. In some cases, data stored in job tracker store 232 may be partitioned to enable fast enumeration of jobs that belong to a specific customer, facilitate efficient bulk record deletion, parallel processing by separate instances of a service and the like. For example, job tracker store 232 may implement tables that are partitioned according to customer account identifiers and that use job identifiers as range keys. The job tracker store 232 may be further sub-partitioned based on time (such as job expiration time) to facilitate job expiration and cleanup operations. As an example, transactions against job tracker store 232 may be aggregated to reduce the total number of transactions. For example, in some implementations, a job tracker 230 may perform aggregate multiple jobs corresponding to multiple requests into one single aggregated job before inserting it into job tracker store 232.

The job tracker 230 may be configured to submit the job for further job scheduling and planning, for example, by services in common control plane 212. Additionally, job tracker 230 may be configured to monitor the execution of jobs and update corresponding job records in job tracker store 232 as jobs are completed. In some cases, job tracker 230 may be further configured to handle customer queries such as job status queries. In some cases, job tracker 230 also provides notifications of job status changes to customers or other services of the archival data storage system. For example, when a data retrieval job is completed, job tracker 230 may cause a customer to be notified (for example, using a notification service) that data is available for download. As another example, when a data storage job is completed, job tracker 230 may notify a cleanup agent 234 to remove payload data associated with the data storage job from a transient payload data cache 228, described below.

The control plane for direct I/O 210 may include a payload data cache 228 for providing transient data storage services for payload data transiting between data plane 214 and front end 208. Such data includes incoming data pending storage and outgoing data pending customer download. As used, transient data store is used interchangeably with temporary or staging data store to refer to a data store that is used to store data objects before they are stored in an archival data storage described or to store data objects that are retrieved from the archival data storage. A transient data store may provide volatile or non-volatile (durable) storage. In most cases, while potentially usable for persistently storing data, a transient data store is intended to store data for a shorter period of time than an archival data storage system and may be less cost-effective than the data archival storage system described. In one case, transient data storage services provided for incoming and outgoing data may be differentiated. For example, data storage for the incoming data, which is not yet persisted in archival data storage, may provide higher reliability and durability than data storage for outgoing (retrieved) data, which is already persisted in archival data storage. In another case, transient storage may be optional for incoming data, that is, incoming data may be stored directly in archival data storage without being stored in transient data storage such as payload data cache 228, for example, when there is the system has sufficient bandwidth and/or capacity to do so.

The control plane for direct I/O 210 may also include a cleanup agent 234 that monitors job tracker store 232 and/or payload data cache 228 and removes data that is no longer needed. For example, payload data associated with a data storage request may be safely removed from payload data cache 228 after the data is persisted in permanent storage (e.g., data plane 214). On the reverse path, data staged for customer download may be removed from payload data cache 228 after a configurable period of time (e.g., 30 days since the data is staged) or after a customer indicates that the staged data is no longer needed.

The cleanup agent 234 may remove a job record from job tracker store 232 when the job status indicates that the job is complete or aborted. As discussed above, in some cases, job tracker store 232 may be partitioned to enable faster cleanup. In one case where data is partitioned by customer account identifiers, cleanup agent 234 may remove an entire table that stores jobs for a particular customer account when the jobs are completed instead of deleting individual jobs one at a time. In another case where data is further sub-partitioned based on job expiration time cleanup agent 234 may bulk-delete a whole partition or table of jobs after all the jobs in the partition expire. In other cases, cleanup agent 234 may receive instructions or control messages (such as indication that jobs are completed) from other services such as job tracker 230 that cause the cleanup agent 234 to remove job records from job tracker store 232 and/or payload data cache 228.

Referring now to common control plane 212 illustrated in FIG. 2, in various implementations, common control plane 212 provides a queue-based load leveling service to dampen peak to average load levels (jobs) coming from control plane for I/O 210 and to deliver manageable workload to data plane 214. The common control plane 212 may include a job request queue 236 for receiving jobs created by job tracker 230 in control plane for direct I/O 210, described above, a storage node manager job store 240 from which services from data plane 214 (e.g., storage node managers 244) pick up work to execute and a job request balancer 238 for transferring job items from job request queue 236 to storage node manager job store 240 in an intelligent manner.

The job request queue 236 may provide a service for inserting items into and removing items from a queue (e.g., first-in-first-out (FIFO) or first-in-last-out (FILO)), a set or any other suitable data structure. Job entries in the job request queue 236 may be similar to or different from job records stored in job tracker store 232, described above.

The common control plane 212 may also provide a durable high efficiency job store, storage node manager job store 240, that allows services from data plane 214 (e.g., storage node manager 244, anti-entropy watcher 252) to perform job planning optimization, check pointing and recovery. As an example, storage node manager job store 240 allows the job optimization such as batch processing, operation coalescing and the like by supporting scanning, querying, sorting or otherwise manipulating and managing job items stored in storage node manager job store 240. In an example, a storage node manager 244 scans incoming jobs and sorts the jobs by the type of data operation (e.g., read, write or delete), storage locations (e.g., volume, disk), customer account identifier and the like. The storage node manager 244 may then reorder, coalesce, group in batches or otherwise manipulate and schedule the jobs for processing. For example, in one case, the storage node manager 244 may batch process all the write operations before all the read and delete operations. In another case, the storage node manager 244 may perform operation coalescing. For another example, the storage node manager 244 may coalesce multiple retrieval jobs for the same object into one job or cancel a storage job and a deletion job for the same data object where the deletion job comes after the storage job.

The storage node manager job store 240 may be partitioned, for example, based on job identifiers, so as to allow independent processing of multiple storage node managers 244 and to provide even distribution of the incoming workload to all participating storage node managers 244. In various implementations, storage node manager job store 240 may be implemented by a NoSQL data management system, such as a key-value data store, a RDBMS or any other data storage system.

The job request balancer 238 may provide a service for transferring job items from job request queue 236 to storage node manager job store 240 so as to smooth out variation in workload and to increase system availability. For example, the job request balancer 238 may transfer job items from the job request queue 236 at a lower rate or at a smaller granularity when there is a surge in job requests coming into the job request queue 236 and vice versa when there is a lull in incoming job requests so as to maintain a relatively sustainable level of workload in the storage node manager store 240. In some cases, such sustainable level of workload is around the same or below the average workload of the system.

The job items that are completed may be removed from storage node manager job store 240 and added to the job result queue 242. As an example, data plane 214 services (e.g., storage node manager 244) may be responsible for removing the job items from the storage node manager job store 240 and adding them to job result queue 242. In some cases, job request queue 236 is implemented in a similar manner as job request queue 236, discussed above.

Referring now to data plane 214 illustrated in FIG. 2. In various implementations, data plane 214 provides services related to long-term archival data storage, retrieval and deletion, data management and placement, anti-entropy operations and the like. In various implementations, data plane 214 may include any number and type of storage entities such as data storage devices (such as tape drives, hard disk drives, solid state devices, and the like), storage nodes or servers, data centers and the like. Such storage entities may be physical, virtual or any abstraction thereof (e.g., instances of distributed storage and/or computing systems) and may be organized into any topology, including hierarchical or tiered topologies. Similarly, the components of the data plane may be dispersed, local or any combination thereof. For example, various computing or storage components may be local or remote to any number of data centers, servers or data storage devices, which in turn may be local or remote relative to one another. In various implementations, physical storage entities may be designed for minimizing power and cooling costs by controlling the portions of physical hardware that are active (e.g., the number of hard drives that are actively rotating). As an example, physical storage entities may implement techniques, such as Shingled Magnetic Recording (SMR), to increase storage capacity.

In an environment illustrated by FIG. 2, one or more storage node managers 244 each controls one or more storage nodes 246 by sending and receiving data and control messages. Each storage node 246 in turn controls a (potentially large) collection of data storage devices such as hard disk drives. In various implementations, a storage node manager 244 may communicate with one or more storage nodes 246 and a storage node 246 may communicate with one or more storage node managers 244. As an example, storage node managers 244 may be implemented by one or more computing devices that are capable of performing relatively complex computations such as digest computation, data encoding and decoding, job planning and optimization and the like. In some cases, storage nodes 246 are implemented by one or more computing devices with less powerful computation capabilities than storage node managers 244. Further, in some cases the storage node manager 244 may not be included in the data path. For example, data may be transmitted from the payload data cache 228 directly to the storage nodes 246 or from one or more storage nodes 246 to the payload data cache 228. In this way, the storage node manager 244 may transmit instructions to the payload data cache 228 and/or the storage nodes 246 without receiving the payloads directly from the payload data cache 228 and/or storage nodes 246. In various implementations, a storage node manager 244 may send instructions or control messages to any other components of the archival data storage system 206 described to direct the flow of data.

The storage node manager 244 may serve as an entry point for jobs coming into and out of data plane 214 by picking job items from common control plane 212 (e.g., storage node manager job store 240), retrieving staged data from payload data cache 228 and performing necessary data encoding for data storage jobs and requesting appropriate storage nodes 246 to store, retrieve or delete data. Once the storage nodes 246 finish performing the requested data operations, the storage node manager 244 may perform additional processing, such as data decoding and storing retrieved data in payload data cache 228 for data retrieval jobs, and update job records in common control plane 212 (e.g., removing finished jobs from storage node manager job store 240 and adding them to job result queue 242).

The storage node manager 244 may perform data encoding according to one or more data encoding schemes before data storage to provide data redundancy, security and the like. Such data encoding schemes may include encryption schemes, redundancy encoding schemes such as erasure encoding, redundant array of independent disks (RAID) encoding schemes, replication and the like. Likewise, as an example, storage node managers 244 may perform corresponding data decoding schemes, such as decryption, erasure-decoding and the like, after data retrieval to restore the original data.

As discussed above in connection with storage node manager job store 240, storage node managers 244 may implement job planning and optimizations such as batch processing, operation coalescing and the like to increase efficiency. In some cases, jobs are partitioned among storage node managers so that there is little or no overlap between the partitions. Such cases facilitate parallel processing by multiple storage node managers, for example, by reducing the probability of racing or locking.

In various implementations, data plane 214 may be implemented to facilitate data integrity. For example, storage entities handling bulk data flows, such as storage node managers 244 and/or storage nodes 246, may validate the digest of data stored or retrieved, check the error-detection code to ensure integrity of metadata and the like.

In various implementations, data plane 214 may be implemented to facilitate scalability and reliability of the archival data storage system. For example, in one case, storage node managers 244 maintain no or little internal state so that they can be added, removed or replaced with little adverse impact. In one case, each storage device is a self-contained and self-describing storage unit capable of providing information about data stored thereon. Such information may be used to facilitate data recovery in case of data loss. Furthermore, in one case, each storage node 246 is capable of collecting and reporting information about the storage node, including the network location of the storage node and storage information of connected storage devices to one or more storage node registrars 248 and/or storage node registrar stores 250. In some cases, storage nodes 246 perform such self-reporting at system start up time and periodically provide updated information. In various implementations, such a self-reporting approach provides dynamic and up-to-date directory information without the need to maintain a global namespace key map or index, which can grow substantially as large amounts of data objects are stored in the archival data system.

The data plane 214 may also include one or more storage node registrars 248 that provide directory information for storage entities and data stored thereon, data placement services and the like. Storage node registrars 248 may communicate with and act as a front end service to one or more storage node registrar stores 250, which provide storage for the storage node registrars 248. In various implementations, storage node registrar store 250 may be implemented by a NoSQL data management system, such as a key-value data store, a RDBMS or any other data storage system. In some cases, storage node registrar stores 250 may be partitioned to enable parallel processing by multiple instances of services. As discussed above, in one case, information stored at storage node registrar store 250 is based at least partially on information reported by storage nodes 246 themselves.

The storage node registrars 248 may provide directory services, for example, to storage node managers 244 that want to determine which storage nodes 246 to contact for data storage, retrieval and deletion operations. For example, given a volume identifier provided by a storage node manager 244, storage node registrars 248 may provide, based on a mapping maintained in a storage node registrar store 250, a list of storage nodes that host volume components corresponding to the volume identifier. Specifically, in one case, storage node registrar store 250 stores a mapping between a list of identifiers of volumes or volume components and endpoints, such as Domain Name System (DNS) names, of storage nodes that host the volumes or volume components.

As used, a "volume" refers to a logical storage space within a data storage system in which data objects may be stored. A volume may be identified by a volume identifier. A volume may reside in one physical storage device (e.g., a hard disk) or span across multiple storage devices. In the latter case, a volume comprises volume components each residing on a different storage device. As used, a "volume component" refers a portion of a volume that is physically stored in a storage entity such as a storage device. Volume components for the same volume may be stored on different storage entities. In one case, when data is encoded by a redundancy encoding scheme (e.g., erasure coding scheme, RAID, replication), each encoded data component or "shard" may be stored in a different volume component to provide fault tolerance and isolation. In some cases, a volume component is identified by a volume component identifier that includes a volume identifier and a shard slot identifier. As used, a shard slot identifies a particular shard, row or stripe of data in a redundancy encoding scheme. For example, in one case, a shard slot corresponds to an erasure coding matrix row. In some cases, storage node registrar store 250 also stores information about volumes or volume components such as total, used and free space, number of data objects stored and the like.

The data plane 214 may also include a storage allocator 256 for allocating storage space (e.g., volumes) on storage nodes to store new data objects, based at least in part on information maintained by storage node registrar store 250, to satisfy data isolation and fault tolerance constraints. In some cases, storage allocator 256 requires manual intervention.

In some cases, the data plane 214 also includes an anti-entropy watcher 252 for detecting entropic effects and initiating anti-entropy correction routines. For example, anti-entropy watcher 252 may be responsible for monitoring activities and status of all storage entities such as storage nodes, reconciling live or actual data with maintained data and the like. In various implementations, entropic effects include performance degradation due to data fragmentation resulting from repeated write and rewrite cycles, hardware wear (e.g., of magnetic media), data unavailability and/or data loss due to hardware/software malfunction, environmental factors, physical destruction of hardware, random chance or other causes. Anti-entropy watcher 252 may detect such effects and in some cases may preemptively and/or reactively institute anti-entropy correction routines and/or policies.

The anti-entropy watcher 252 causes storage nodes 246 to perform periodic anti-entropy scans on storage devices connected to the storage nodes. Anti-entropy watcher 252 may also inject requests in job request queue 236 (and subsequently job result queue 242) to collect information, recover data and the like. In some cases, anti-entropy watcher 252 may perform scans, for example, on cold index store 262, described below, and storage nodes 246, to ensure referential integrity.

Information stored at storage node registrar store 250 may be used by a variety of services such as storage node registrar 248, storage allocator 256, anti-entropy watcher 252 and the like. For example, storage node registrar 248 may provide data location and placement services (e.g., to storage node managers 244) during data storage, retrieval and deletion. For example, given the size of a data object to be stored and information maintained by storage node registrar store 250, a storage node registrar 248 may determine where (e.g., volume) to store the data object and provides an indication of the storage location of the data object which may be used to generate a data object identifier associated with the data object. As another example, the storage allocator 256 may use information stored in storage node registrar store 250 to create and place volume components for new volumes in specific storage nodes to satisfy isolation and fault tolerance constraints. As yet another example, the anti-entropy watcher 252 may use information stored in storage node registrar store 250 to detect entropic effects such as data loss, hardware failure and the like.

In some cases, data plane 214 also includes an orphan cleanup data store 254, which is used to track orphans in the storage system. As used, an orphan is a stored data object that is not referenced by any external entity. In various implementations, orphan cleanup data store 254 may be implemented by a NoSQL data management system, such as a key-value data store, an RDBMS or any other data storage system. In some cases, storage node registrars 248 stores object placement information in orphan cleanup data store 254. Subsequently, information stored in orphan cleanup data store 254 may be compared, for example, by an anti-entropy watcher 252, with information maintained in metadata plane 216. If an orphan is detected, in some cases, a request is inserted in the common control plane 212 to delete the orphan.

Referring now to metadata plane 216 illustrated in FIG. 2. In various implementations, metadata plane 216 provides information about data objects stored in the system for inventory and accounting purposes, to satisfy customer metadata inquiries and the like. In the illustrated example, metadata plane 216 includes a metadata manager job store 258 which stores information about executed transactions based on entries from job result queue 242 in common control plane 212. In various implementations, metadata manager job store 258 may be implemented by a NoSQL data management system, such as a key-value data store, a RDBMS or any other data storage system. In some cases, metadata manager job store 258 is partitioned and sub-partitioned, for example, based on logical data containers, to facilitate parallel processing by multiple instances of services such as metadata manager 260.

In the illustrative example, metadata plane 216 also includes one or more metadata managers 260 for generating a cold index of data objects (e.g., stored in cold index store 262) based on records in metadata manager job store 258. As used, a "cold" index refers to an index that is updated infrequently. In various implementations, a cold index is maintained to reduce cost overhead. In some cases, multiple metadata managers 260 may periodically read and process records from different partitions in metadata manager job store 258 in parallel and store the result in a cold index store 262.

In some cases, cold index store 262 may be implemented by a reliable and durable data storage service. In some cases, cold index store 262 is configured to handle metadata requests initiated by customers. For example, a customer may issue a request to list all data objects contained in a given logical data container. In response to such a request, cold index store 262 may provide a list of identifiers of all data objects contained in the logical data container based on information maintained by cold index store 262. In some cases, an operation may take a relative long period of time and the customer may be provided a job identifier to retrieve the result when the job is done. In other cases, cold index store 262 is configured to handle inquiries from other services, for example, from front end 208 for inventory, accounting and billing purposes.

In some cases, metadata plane 216 may also include a container metadata store 264 that stores information about logical data containers such as container ownership, policies, usage and the like. Such information may be used, for example, by front end 208 services, to perform authorization, metering, accounting and the like. In various implementations, container metadata store 264 may be implemented by a NoSQL data management system, such as a key-value data store, a RDBMS or any other data storage system.

As described, in various implementations, the archival data storage system 206 described is implemented to be efficient and scalable. As an example, batch processing and request coalescing may be used at various stages (e.g., front end request handling, control plane job request handling, data plane data request handling) to improve efficiency. As another example, processing of metadata such as jobs, requests and the like may be partitioned so as to facilitate parallel processing of the partitions by multiple instances of services.

Data elements stored in the archival data storage system (such as data components, volumes, described below) may be self-describing so as to avoid the need for a global index data structure. As an example, data objects stored in the system may be addressable by data object identifiers that encode storage location information. As another example, volumes may store information about which data objects are stored in the volume and storage nodes and devices storing such volumes may collectively report their inventory and hardware information to provide a global view of the data stored in the system (such as evidenced by information stored in storage node registrar store 250). In such a case, the global view is provided for efficiency only and not required to locate data stored in the system.

In various implementations, the archival data storage system described is implemented to improve data reliability and durability. As an example, a data object is redundantly encoded into data components and stored across different data storage entities to provide fault tolerance. As another example, data elements may have multiple levels of integrity checks. Parent/child relations may always have additional information to ensure full referential integrity. As an example, bulk data transmission and storage paths may be protected by having the initiator pre-calculate the digest on the data before transmission and subsequently supply the digest with the data to a receiver. The receiver of the data transmission is responsible for recalculation, comparing and then acknowledging to the sender that includes the recalculated digest. Such data integrity checks may be implemented, for example, by front end services, transient data storage services, data plane storage entities and the like described above.

The datacenter level scheduler may be able to determine whether an operation can be performed within the remaining resource budget by first determining the number of drives required for the operation, determining the type of operations (i.e., jobs) to be performed (e.g., sequential read, sequential write, random read, random write, etc.), whether idle drives are available or whether drives must be spun up from standby mode, and then determining the power necessary to perform the operation. An example of a datacenter level scheduler making such a determination is illustrated in FIG. 3.

Figure 3:
FIG. 3 illustrates an example of changing drive operations in accordance with an embodiment.

FIG. 3 presents an example situation 300 where a rack of 20 hard drives 304 have been assigned a resource budget of 100 watts (100 W). In this example, any given hard drive of the hard drives 304 are known by the datacenter level scheduler to consume 1 W of power in standby mode, 4 W of power in idle mode, 7 W of power when reading, and 9 W of power when writing. The specific power amounts may have been provided by the manufacturer or vendor of the hard drives, or may have been measured by the computing resource service provider hosting the racks. Note that the power draws described in FIG. 3 are for illustrative purposes only, and the actual power utilization of drives performing various activities may vary, and that the resource budget for the example situation 300 discounts other aspects of power utilization by the system, such as power consumed by cooling systems and other components of the rack. In non-illustrative situations, the resource budget may take these additional power considerations into account.

In an initial state 302(a), ten hard drives 304 are in standby mode consuming 10 W, four hard drives 304 are in idle mode consuming 16 W, three hard drives 304 are reading, consuming 21 W, and three hard drives 304 are writing, consuming 27 W, for a total of 74 W being consumed. With the budget of 100 W, this leaves 26 W available to perform additional jobs. Suppose, for example, a job is in the queue that requires four additional drives for writing. Using the four idle hard drives 306 for the write job would consume an additional 20 W, as depicted in situation 302(b):

$$(9 W - 4 W) \times 4 = 20 W$$

This would result in a total power utilization of 94 W, which allows the rack to remain safely within budget. However, suppose that the drives needed for the job are among the hard drives 304 in standby mode. If the hard drives 308 in standby mode are switched to writing, as illustrated by the situation 302(c), the power utilization of the rack now becomes 106 W:

$$(1 W \times (10-4)) + (4 W \times 4) + (7 W \times 3) + (9 W \times (3+4)) = 106 W$$

Doing this, then would exceed the resource budget of 100 W. On the other hand, if two hard drives 310 are switched from idle to standby mode, then four hard drives 312 may then be switched from standby mode to writing without exceeding the resource budget, as shown by situation 302(d):

$$(1 W \times ((10-4)+2)) + (4 W \times (4-2)) + (7 W \times 3) + (9 W \times (3+4)) = 100 W$$

Note that, if in this example, the power values of 1 W in standby mode, 4 W in idle mode, 7 W for reads, and 9 W for writes are estimates, such as specified by the hard drive manufacturer, the actual total power utilization may be different. As an example where the datacenter level scheduler is able to measure actual power utilization (e.g., via a wattmeter), it may be found that the power utilization in the initial state is actually 68 W, rather than 74 W. In such a case, the datacenter level scheduler may be able to determine that switching the four hard drives 308 from standby mode to writing could be safely done without exceeding the resource budget. Also note that this simplified example does not model other states that may need to be taken into consideration. In some cases, an implementation may also consider the power requirements of spinning up the drive from standby mode to write mode, consider the power requirements of seeks, differentiate the power requirements of sequential operations versus random operations, may consider the different power requirements of different brands and models of hard drives 304 within the rack, and may consider additional power considerations, such as additional power draw by cooling equipment when hard drives 304 are moved from a less active state to a more active state.

Figure 4:
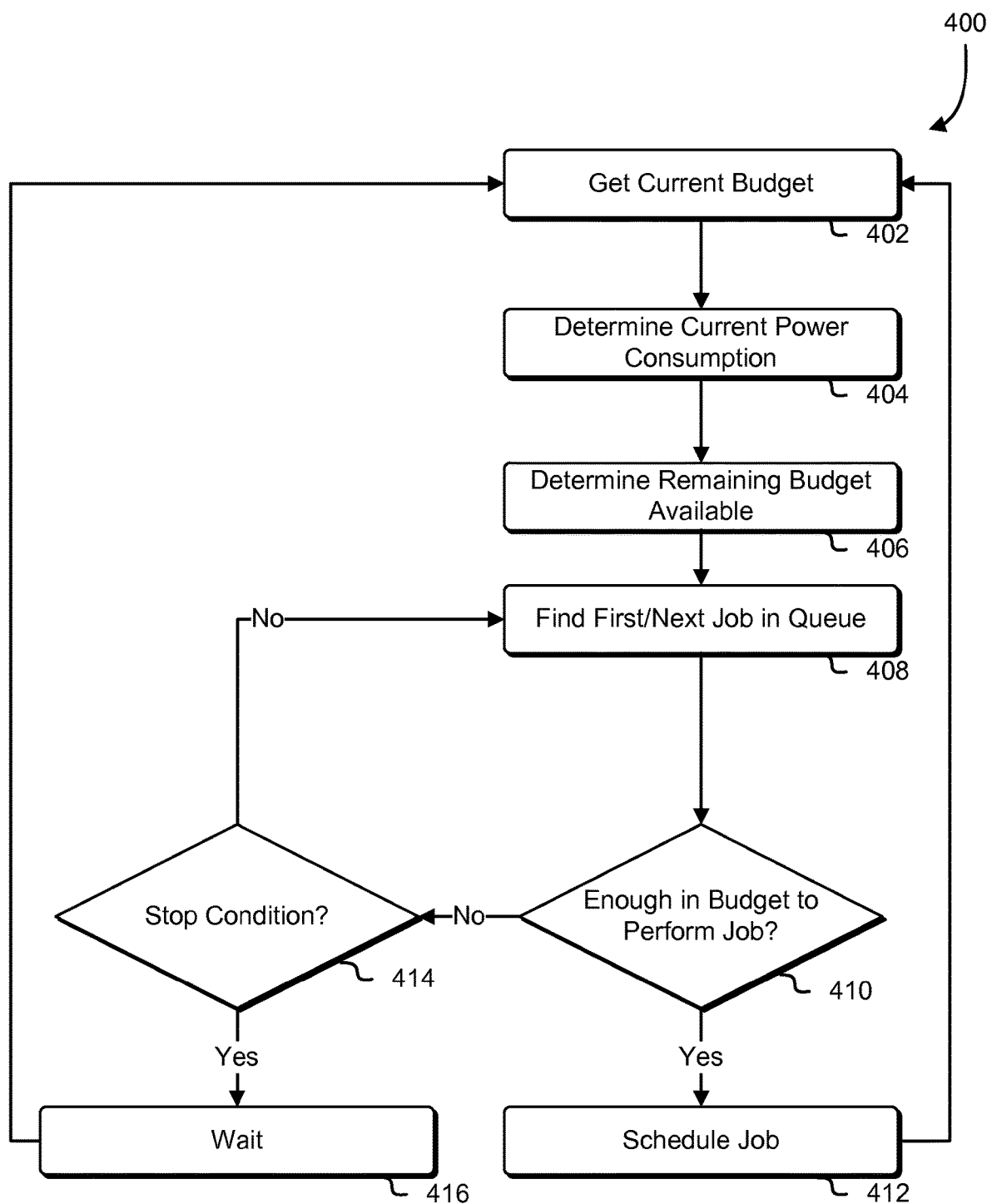
FIG. 4 is a flow chart that illustrates an example of scheduling jobs in a job queue in accordance with an embodiment.

FIG. 4 is a flow chart illustrating an example of a process 400 for job scheduling according to a resource budget in accordance with various embodiments. The process 400 may be performed by any suitable system, such as a server in a data center, by multiple computing devices in a distributed system of a computing resource service provider, or any electronic client device such as the electronic client device 1202 described in conjunction with FIG. 12. The process 400 includes a series of operations wherein the system determines whether there is enough power available in the resource budget to perform additional work. In 402, the system performing the process 400 determines the present resource budget of a set of equipment (e.g., racks, hard drives, servers, cooling equipment, etc.), which may include a set of one item. Note that the resource budget may be a maximum value in units of power, such as kilovolt-amperes or watts (W), or may be another type of unit that has an impact on the amount of power consumed, such as a percentage of processor utilization, number or percentage of hard drives spinning, or temperature. In one example, the resource budget may be a value expressly input by a user, such as a technician for a data center, through a graphical user interface. In another example, the resource budget may be adjusted programmatically, such as according to various rules or conditions (e.g., set the resource budget to be one value if the outside temperature exceeds a certain value, set the resource budget to be a different value if the outside temperature falls below a different value, etc.). A computing resource service provider may provide customers with application programming interfaces allowing the customers to increase or decrease their resource budgets through web service or function calls, in some cases charging the customer more or less for usage in response to the increase or decrease.

In 404, the system performing the process 400 determines the present power utilization of the equipment being managed. Such power utilization may include power consumed by cooling equipment, hard drives, servers, and other accessories corresponding to the equipment. In some cases, the power utilization may be determined mathematically based on the activities being performed by the equipment and a known power draw for the activities (e.g., known power draw based on rotations per minute of cooling fans, known power draw for random reads, known power draw for sequential writes, etc.). In other cases, the power utilization of the equipment may be measured directly, such as by way of a wattmeter or similar device interfaced between the equipment and the datacenter level scheduler. In 406, the amount of power (or other unit) remaining in the budget may be determined. In most cases, this may be determined by subtracting the present power utilization determined in 404 from the present resource budget determined in 402.

In 408 of the embodiment exemplified by process 400, the system may retrieve its job queue to determine whether additional jobs may be performed within the resource budget. The job queue may be in the form of a list of batch jobs for hard drive operations and may specify an amount of data to be read or written, how and whether the data has been broken into various shards of data, and which and how many hard drives may be used in the operations. The first time the operations of 408 are performed, the system may retrieve the first job in the queue, which in some cases may be the oldest job, may be the job requiring the least amount of power, or, in other cases, may be a highest-priority job in compliance with a service-level agreement with a customer.

One or more operations of the process 400 may be performed by a datacenter level scheduler. The datacenter level scheduler may be configured to determine, based on various factors, which work should be performed and when the work should be performed. Factors in making this determination include the corpus of work that needs to be performed, including such work as read operations, write operations, and entropy-correction operations (e.g., defragmentation, error correction, etc.), and which work (e.g., batch jobs) can be performed within the resource budget. Another factor may be the size and number of data shards involved in the work. The datacenter level scheduler may also take service-level agreements associated with the work into consideration when scheduling the work, which may be specified according to a priority queue or through a set of rules. Based on the determination, the datacenter level scheduler may be configured to postpone non-critical repair/maintenance work or other less-important work in order to meet requirements such as remaining under the resource budget and meeting service-level agreement obligations.

In some cases, the datacenter level scheduler may be configured to take the identity of the hard drives destined for the work into consideration. For example, some work may be temporarily postponed in anticipation of aggregating it with work destined for the same drive. When an aggregation of work of a suitable (e.g., threshold) size or number of jobs is reached, the aggregation of work may be scheduled to be performed. In this way, an aggregation of work destined for a certain drive may be performed at once with a potential cost-saving benefit (e.g., the drive need not be spun up from standby or idle mode between jobs). Such work may be postponed for a period of time and, if no other work is found to aggregate with the work, the work may be scheduled to be performed anyway.

With an archival storage service of a computing resource service provider, customers may be charged for retrieval (e.g., read operations) of data from storage. It may be that the turnaround time for data retrieved for a customer could be in a range of three to five hours. In some cases, the computing resource service provider may provide a discount to customers who specify that a longer retrieval time, such as within 48 hours, is acceptable, because the computing resource service provider may be able to offset a portion of the retrieval cost with savings achieved by being able to schedule the work for off-peak times or to be performed during times when power may be used at a discounted rate.

In 410, the system performing the process 400 may determine whether the selected job may be performed within the remaining resource budget. For example, if there is 20 W remaining in the resource budget and the selected batch job requires four drives consuming 4 W apiece (i.e., for a total of 16 W), the system may determine that the batch job may be performed and may command the job to be performed. However, incidental factors, such as the resource cost of spinning up a hard drive from standby mode (e.g., incidental resource costs), may also be considered in 410. For example, if the hard drives necessary to perform the above-described batch job require the four hard drives to be spun up from standby mode, each requiring 8 W to do so, the power required to spin up the hard drives simultaneously would exceed the power remaining in the resource budget. Therefore, at this stage, a determination may be made as to which equipment may be affected by performing the job, such as whether and how many hard drives must be spun up from standby mode or whether some idle hard drives (if any) may be utilized for the operations. Moreover, the datacenter level scheduler may, in some cases, determine whether it may be possible to stagger implementing portions of the batch job in order to stay within the resource budget. For example, using the situation described above, the system may spin up one hard drive (8 W) and, when the hard drive finishes spinning up and begins the activity that only consumes 4 W (per the example above), the system may spin up the next hard drive (8 W), and so on until all hard drives are safely spun up and performing their activities within the resource budget.

It should be noted that, in some embodiments there may be one or more particular jobs that, possibly due to a particular service-level agreement associated with the job, may not be bypassed and, in such a case, the particular jobs may be scheduled even if doing so would exceed the present resource budget. I.e., in some cases such jobs may override the resource budget. In other embodiments, if there is not enough available power in the resource budget to perform those particular jobs, reaching such a particular job may result in a stop condition, as described in 404. In this manner, the stop condition may aid in ensuring that the particular job is processed by preventing later jobs or less-critical jobs from being scheduled ahead of the particular job.

In 412, if there is enough power remaining in the budget to perform the selected job, the job may be scheduled. In some cases, this may mean that the job is performed immediately. In other cases, job schedules may be planned in advance; that is, the job may be scheduled to be performed at some time and/or date in the future. In these cases, the present power utilization obtained in 404 for future operations may actually be calculated based on known factors, such as hard drive activity, active servers and cooling equipment, and may have a buffer built into the calculation to account for the effects of other factors, such as outside temperature. In some of these cases, when the time/date scheduled for the job is imminent, the calculated power utilization may be compared to a measured power utilization to determine whether any adjustment to the job queue needs to be made. For example, if the calculation underestimated the amount of remaining power in 406, the system performing the process 400 may repeat the process 400 to determine whether additional jobs may be performed at this time.

On the other hand, if the selected job cannot be performed within the remaining budget, in 414, the system performing the process may determine whether a stop condition has been reached. Examples of stop conditions include that the system has examined all of the jobs in the queue or that there may be no more jobs left in the queue that could be performed within the remaining budget; for example, if there is only 0.3 W remaining in the queue and no job could possibly be performed for 0.3 W, the system may cease looking further in the queue. However, if no stop condition applies, the system performing the process 400 may loop back to 408, whereupon the next batch job in the queue is selected and the operations of 408-14 may be repeated.

Otherwise, if a stop condition is found to apply, in 416, the system performing the process 400 may wait for a period of time or an occurrence of an event before proceeding to 402 and repeating operations 402-16. For example, the system performing the process 400 may pause for one minute, the system may pause until one or more already-scheduled jobs have completed, and/or the system may proceed if the system detects that the resource budget and/or the present power utilization has changed. When the pause of 416 ends, the system performing the process 400 may proceed to 402, whereupon the operations of 402-16 may be repeated. Note that the operations performed in 402-16 may be performed in various orders and combinations, including in parallel.

Figure 5:
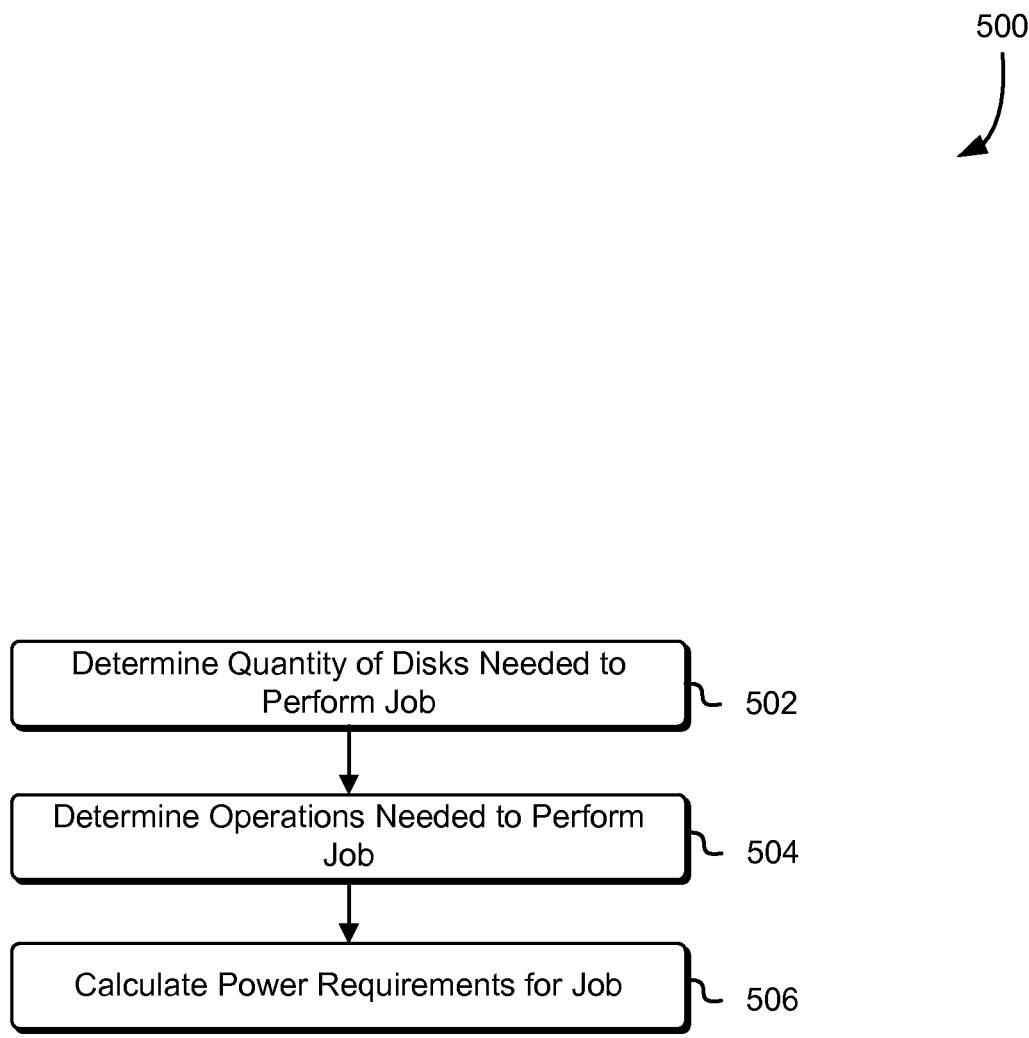
FIG. 5 is a block diagram that illustrates an example of determining power requirements in accordance with an embodiment.

FIG. 5 is a block diagram illustrating an example of a process 500 for determining the power requirements for a batch job, such as may be done in 410 of FIG. 4, in accordance with various embodiments. The process 500 may be performed by any suitable system such as a server in a data center, by multiple computing devices in a distributed system of a computing resource service provider, or any electronic client device such as the electronic client device 1202 described in conjunction with FIG. 12. In 502, a datacenter level scheduler may determine the number of hard drives needed to perform the job. For example, data may be split into multiple shards, and the shards of data may be distributed over one or more hard drives; in some cases, this may be done to allow more efficient reading/writing, by allowing the data to be read/written in parallel. The amount of data and the space available on each of the hard drives may also be a factor in determining the number of hard drives; for example, if a write operation involves data that is too big to fit on a single hard drive, the data may be split into multiple shards and distributed over multiple hard drives.

In these and other cases, the data may be distributed over multiple hard drives for fault isolation purposes, and in some cases, there may be data redundancy, such as in a RAID level 1 or higher. In 502, these factors may be considered when determining the number of hard disks that may be needed to perform the job. In 502, the system performing the process may also consider the make and model of the hard drives available in making the determination of which and how many hard drives to use for the operation, as different hard drive models may have different power requirements for different operations.

In 504, the operations necessary to perform the job are determined. In some embodiments, the operations may be no more complex than determining whether the job requires reading or writing. In other embodiments, reading and writing operations may be further divided into sequential reads, sequential writes, random reads, and random writes. In still other embodiments, the datacenter level scheduler may determine whether the drive operations may be able to utilize drives that are currently idling, or whether some or all drives will be needed to be spun up from standby mode, examples of which may be found in the description of FIG. 3.

The incidental resource cost of spinning up a hard drive from unspun to spinning is often a bigger power draw than most other hard drive operations. Thus, spinning up a hard drive to perform a just a few jobs may not be as cost effective as allowing the job queue to build up such that the cost of spinning up the drive may be amortized over more jobs. Likewise, if a hard drive is already spinning, it may not be cost effective to spin the hard drive down if there are jobs in the queue that will require attention of the drive a short period of time later. Likewise, the power requirements of other operations, such as read operations and entropy-type operations, such as may be performed by the anti-entropy watcher 252 of FIG. 2, may also be factors considered by the datacenter level scheduler. The datacenter level scheduler of the present disclosure should be understood to include such considerations when determining what actions to take to achieve the most efficient use of power.

Finally, in 506, the power requirements for performing the batch job may be determined based on the quantity of hard drives to be used and the power necessary for each of those hard drives to perform the specific operations, as well as any additional power costs, such as those associated with spinning up hard drives from standby mode or increased cooling fan speed. The power requirements determined in 506 may then be used to determine, as in 410 of FIG. 4, whether the job may be performed within the available power remaining in the resource budget. Note that the operations performed in 502-06 may be performed in various orders and combinations, including in parallel.

The resource budget described in the present disclosure may also be adjustable, manually or programmatically. That is, there may be a user interface where technicians can modify the resource budget for one or more racks, as may be needed in response to certain conditions. In various embodiments, freeing up resources (e.g., power, network bandwidth, etc.) in one part of the overall system (e.g., a data center) may allow those resources to be used by other parts of the overall system.

For example, on a hot summer afternoon, cooling equipment in a data center may require additional power in order to keep the equipment in the data center cool, and, in order to reduce the cooling needed and/or to reduce the overall power utilization of the data center, the technicians may use the interface to manually reduce the available power in the resource budgets on one or more racks at least temporarily during the hot period. The reduction of the power to the one or more racks may not only allow that power to be routed to the cooling equipment, but may further cause the one or more racks to not generate as much heat and, consequently, less cooling may be necessary. Alternately or additionally, the resource budget may be adjusted programmatically according to various conditions or factors. For instance, the datacenter level scheduler of a data center may be communicatively coupled to a device that measures the temperature outside the data center, such as a digital thermometer, and the datacenter level scheduler may be configured to automatically reduce the resource budgets for one or more racks if the outside temperature rises above a particular threshold (e.g., 90 degrees Fahrenheit) and automatically increase the resource budgets for the one or more racks if the outside temperature falls below the same or different threshold.

As another example, certain racks may have power needs that take priority over other racks. In such an example, it may be that the datacenter level scheduler determines that those certain racks need an additional 1KVA to perform priority operations. Upon making that determination, the datacenter level scheduler may select one or more lower-priority racks and reduce their cumulative resource budgets by 1KVA. In this manner, the higher-priority jobs are able to realize additional power without an overall increase in the power utilization of the data center.

Figure 6:
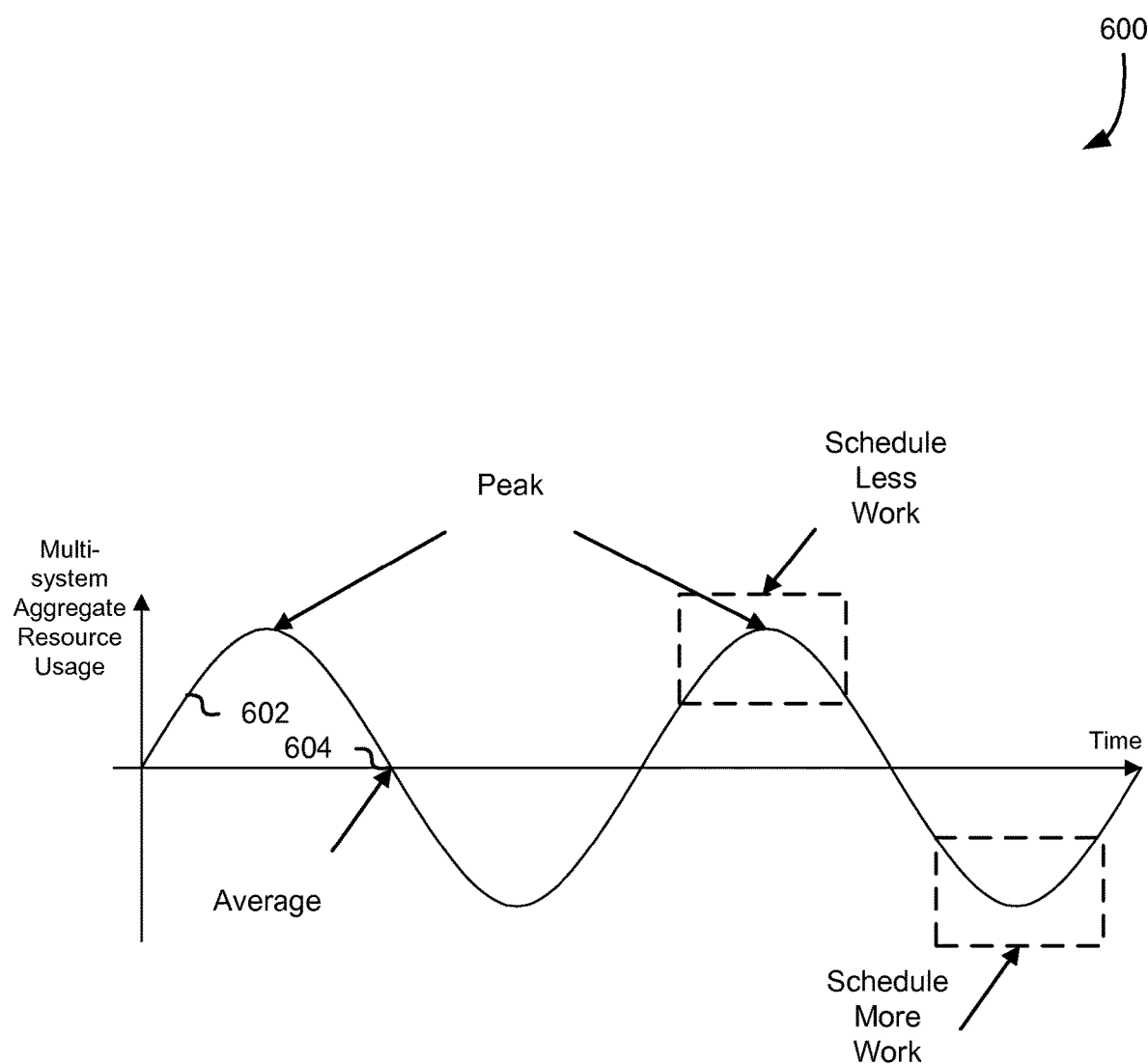
FIG. 6 illustrates an example of a dynamic resource budget in accordance with an embodiment.

FIG. 6 is an illustration of a graph 600 of an embodiment of the present disclosure/etc. Specifically, a line 602 in FIG. 6 represents aggregate resource usage (e.g., power utilization) of a system, such as distributed computing system (i.e., comprising multiple systems) in a data center, over time. The intersection 604 of the horizontal and vertical axes represents an average resource usage of the system. Over time, there may be periods of peak demand for resources as well as periods of less demand. The graph 600 of FIG. 6 is intended to be illustrative only, and it is expected that actual resource demand will likely vary significantly from the graph 600; i.e., the line 602 will likely not be as smooth or regularly cyclical, may experience sudden, sharp peaks and/or lulls in resource demand, and may experience sustained peaks and/or lulls in resource demand.

The system of this embodiment is presumed to have a resource budget as described in the present disclosure for performing work in a cost-efficient manner. To reduce costs further, the resource budget of some systems may be temporarily reduced when other systems have a demand for more power. That is, during times of peak usage, it may be that some services within the system, such as archival data storage services, may be configurable to perform less work, such as may be accomplished by reducing the resource budget for such services, in order not to contribute as much to the peak usage. In exchange, such services may be permitted to perform more work during periods of less demand.

As an example, assume that a rack in a data center has a resource budget of 2 KW that can be set dynamically. For some time during the day, the rack may consume 2 KW, but on average, the rack may have an average load of 1 KW. On the hottest day of the year, in this example, the data center may need an additional 100 KW to keep the equipment in the data center cool. In a case where there are 100 rack positions of this power configuration, an administrator may be able to set the resource budgets of the 100 rack positions to have a maximum load of 1 KW, thereby freeing up 100 KW for the cooling needs. Alternately or additionally, resource budgets for various rack positions may be set programmatically, such as according to a prioritization scheme. For example, lower-priority racks may have their resource budgets decreased before the resource budgets of higher-priority racks are touched, or the resource budgets of lower-priority racks may be reduced by a greater amount than the resource budgets of higher-priority racks. For example, given a situation where there is a surge of compute activity elsewhere in the data center (e.g., a large system may begin running a massive, power-intensive simulation), requiring an additional 100 KW to serve all loads in the data center. In this case, a datacenter level scheduler may lower the resource budgets for 50 lower-priority rack positions from 2 KW to 0.5 KW (freeing up 75 KW) and lower the resource budgets for 50 higher-priority rack positions from 2 KW to 1.5 KW (freeing up 25 KW), thereby freeing up a total of 100 KW to allow the other compute racks to meet the demand.

Note that while the line 602 has been described in terms of resource usage, in another embodiment of the present disclosure, the line 602 may represent variable pricing by a power utility. For example, during times of high power demand, such as during hot, summer hours, a power utility may charge more for power usage than during other times, such as in the evenings or during cooler seasons. During these higher-cost periods, a datacenter level scheduler of the present disclosure may be configurable to reduce its power utilization by temporarily lowering resource budgets for one or more racks or other equipment. Then, when pricing is cheaper, more work may be scheduled, as may be done by increasing the resource budgets for the one or more racks or equipment. This flexibility may provide a variety of benefits, including potential cost savings by allowing a data center to take advantage of periods of lower cost for power and to consume less power during periods of high cost.

Figure 9:
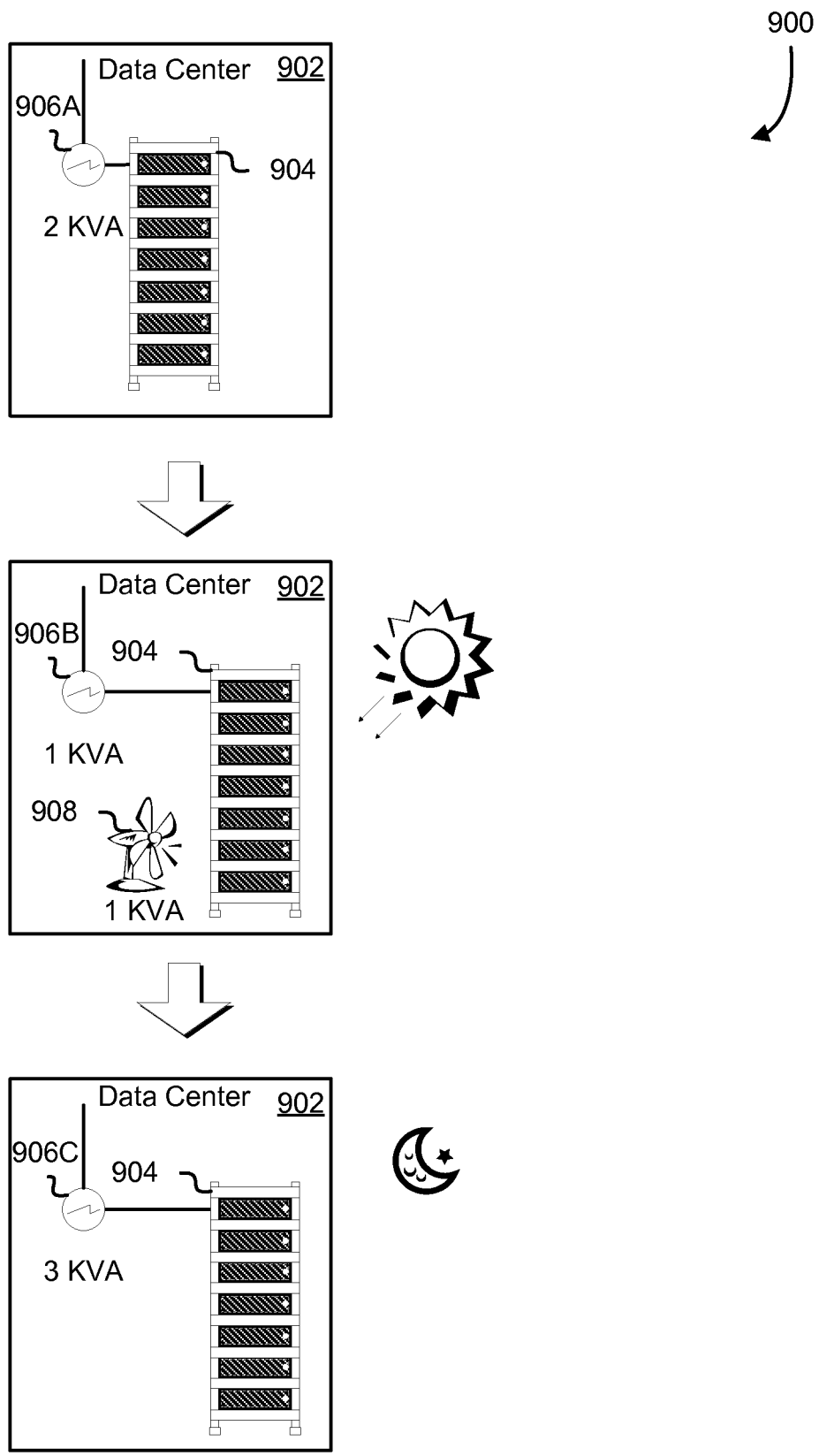
FIG. 9 illustrates an example of adjusting a resource budget in response to outside temperature in accordance with an embodiment.

In some embodiments, a resource budget debt (e.g., 1KVA in this example) to the selected one or more lower-priority racks may be acknowledged. The resource budget debt may be repaid by reducing the resource budget of the high-priority racks and increasing the resource budgets for the one or more lower-priority racks during a time when the high-priority racks may have lower-priority jobs or power requirements. In some cases, the resource budget debt may be a like amount (e.g., +/−1KVA), however it is not necessary that the resource budget debt be equal in time and/or power to the original reduction. Likewise, the resource budget debt need not be incurred by granting additional power to higher priority racks, but may be incurred due to other factors, such as environmental factors. In other embodiments, rather than tracking a resource budget debt, lower-priority racks may instead receive input that the higher-priority racks have an excess capacity of resources (e.g., they are not consuming all of the power they have available) and the lower-priority racks may use the excess capacity of resources if needed. FIG. 9 presents an illustration of these embodiments.

Figure 7:
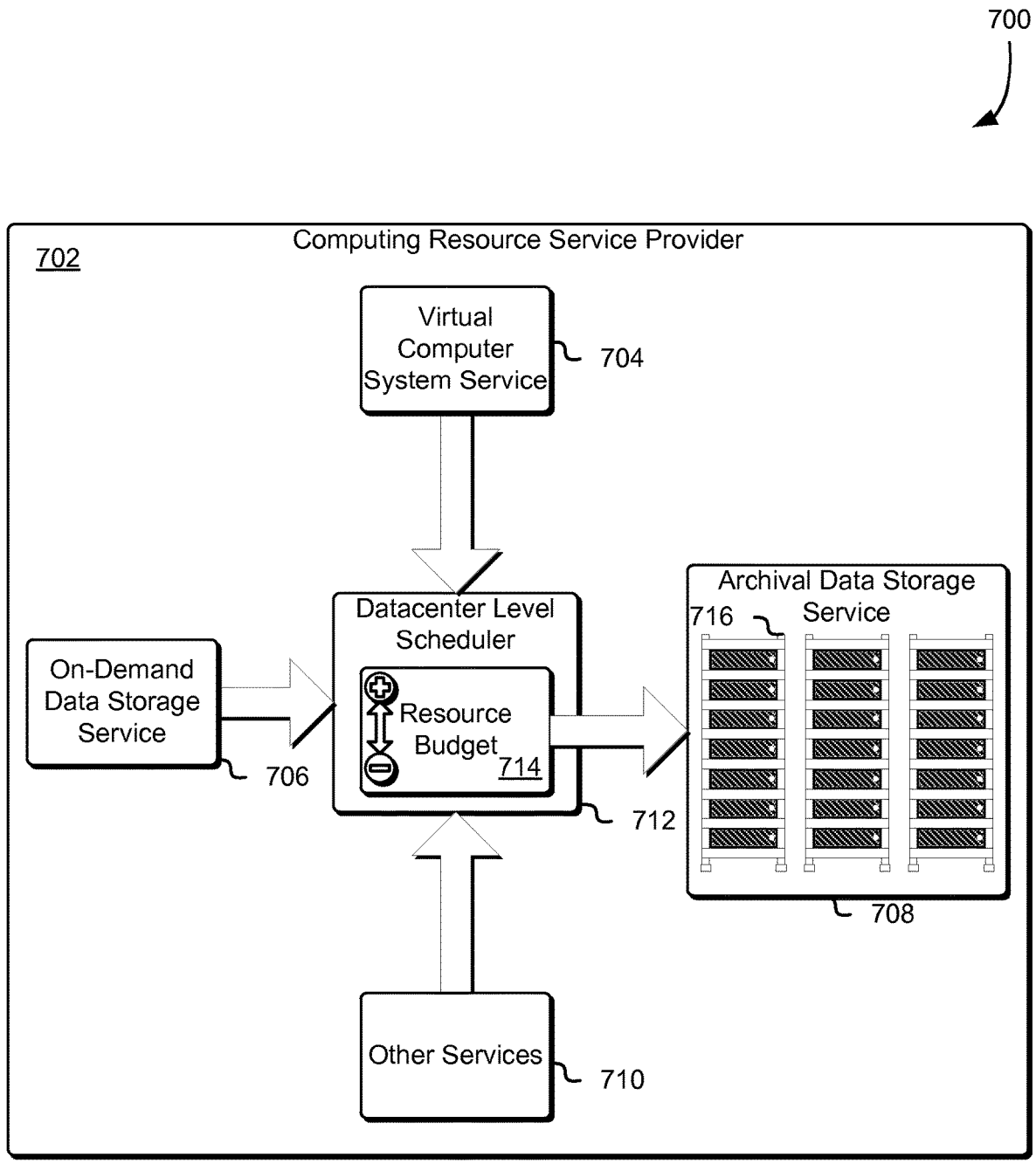
FIG. 7 illustrates an example of a datacenter scheduler adjusting a resource budget based at least in part on input from services of a computing resource service provider in accordance with an embodiment.

FIG. 7 illustrates an aspect of an environment 700 in which an embodiment may be practiced/example embodiment. As illustrated in FIG. 7, the environment 700 may include a computing resource service provider 702 hosting such services as a virtual computer system service 704, an on-demand data storage service 706, an archival data storage service 708, and one or more other services 710. In the environment 700, a datacenter level scheduler 712 that adjusts one or more resource budgets 714 for one or more rack positions 716 in the archival data storage service 708 based in part on input from the services 704-10 may be present.

The computing resource service provider 702 of FIG. 7 may provide a variety of services to a customer and the customer may communicate with the computing resource service provider 702 via a web services interface or other type of customer interface. The customer of the computing resource service provider 702 may be an organization that may utilize one or more of the services provided by the computing resource service provider 702 to maintain and deliver information to its employees, who may be located in various geographical locations. Alternatively, the customer may be an individual who utilizes the services of the computing resource service provider 702 to deliver content to a remotely-located working group. The customer of the computing resource service provider 702 may communicate with the computing resource service provider 702 through a communication network, such as the Internet, an intranet, or an Internet service provider (ISP) network. Some communications from the customer to the computing resource service provider 702 may cause the computing resource service provider 702 to operate in accordance with one or more embodiments described herein or a variation thereof.

The computing resource service provider 702 may provide various computing resource services to its customers. The services provided by the computing resource service provider 702, in this example, include a virtual computer system service 704, an on-demand data storage service 706, and one or more other services 710. It is noted that not all embodiments described herein include the services described with reference to FIG. 7 and additional services may be provided in addition to or as an alternative to services explicitly described herein. As described herein, each of the services may include one or more web service interfaces that enable a customer to submit appropriately configured application programming interface calls to the various services through web service requests. In addition, each of the services may include one or more service interfaces that enable the services to access each other (e.g., to enable a virtual computer system of the virtual computer system service 704 to store data in or retrieve data from the on-demand data storage service 706 and/or to access one or more devices provided by the one or more other services 710).

The virtual computer system service 704 may be a collection of computing resources configured to instantiate virtual machine instances on behalf of a customer. The customer may interact with the virtual computer system service 704 (via appropriately configured and authenticated application programming interface calls) to provision and operate virtual computer systems that are instantiated on physical computing devices hosted and operated by the computing resource service provider 702. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual computer system service 704 is shown in FIG. 7, any other computer system or computer system service may be utilized in the computing resource service provider 702, such as a computer system or computer system service that does not employ virtualization or instantiation and instead provisions computing resources on dedicated or shared computers/servers and/or other physical devices.

The computing resource service provider 702 further includes an on-demand data storage service 706. The on-demand data storage service 706 may be a collection of computing resources configured to synchronously process requests to store and/or access data. The on-demand data storage service 706 may operate using computing resources (e.g., databases) that enable the on-demand data storage service 706 to locate and retrieve data quickly, so as to allow data to be provided in responses to requests for the data. For example, the on-demand data storage service 706 may maintain stored data in a manner such that, when a request for a data object is retrieved, the data object can be provided (or streaming of the data object can be initiated) in a response to the request. As noted, data stored in the on-demand data storage service 706 may be organized into data objects. The data objects may have arbitrary sizes except, perhaps, for certain constraints on size. Thus, the on-demand data storage service 706 may store numerous data objects of varying sizes. The on-demand data storage service 706 may operate as a key value store that associates data objects with identifiers of the data objects which may be used by a customer to retrieve or perform other operations in connection with the data objects stored by the on-demand data storage service 706.

The computing resource service provider 702 further includes an archival data storage service 708, such as an archival storage service described in conjunction with FIG. 2. The archival data storage service 708 may comprise a collection of computing resources that collectively operate to provide storage for data archiving and backup of customer data. The data may comprise one or more data files that may be combined to form an archive. The archival data storage service 708 may be configured to persistently store data that may be infrequently accessed and for which long retrieval times are acceptable to a customer utilizing the archival data storage service 708. A customer may interact with the archival data storage service 708 (for example, through appropriately configured application programming interface calls made to the archival data storage service 708) to generate one or more archives, upload and retrieve the one or more archives or monitor the generation, upload or retrieval of the one or more archives.

The computing resource service provider 702 may additionally maintain one or more other services 710 based at least in part on the needs of its customers. For instance, the computing resource service provider 702 may maintain a database service for its customers. A database service may be a collection of computing resources that collectively operate to run one or more databases for one or more customers. The customer may operate and manage a database from the database service by utilizing appropriately configured application programming interface calls. This, in turn, may allow a customer to maintain and potentially scale the operations in the database. Other services include block-level data storage services, cryptography services, notification services, authentication services, policy management services, task services, and services that manage and/or monitor other services.

As illustrated by FIG. 7, the archival data storage service may comprise one or more rack positions 716 containing various equipment, including servers, disk drive arrays and cooling equipment. Furthermore, in the various embodiments, the rack positions 716 may be assigned at least one of the resource budgets 714 for managing power, network bandwidth, processor and hard drive utilization, and/or other resources of the rack positions 716 in the manner described in this disclosure. A resource budget 714 may be assigned to any of a group of racks, individual racks, individual servers or drive arrays within a rack, or individual cooling components.

The resource budget 714 is maintained by the datacenter level scheduler 712. The datacenter level scheduler 712 may adjust the resource budget 714 up or down according to various factors, including input from one or more of the services 704-710. For example, if the virtual computer system service 704 has a surge of activity (e.g., a customer using the virtual computer system service 704 of the computing resource service provider 702 for hosting a large online marketplace may have a surge of activity in days leading up to or following a holiday), the virtual computer system service 704 may communicate to the datacenter level scheduler 712 that additional power is needed to service the computing and/or network loads. The datacenter level scheduler may respond by decreasing the resource budget 714 of one or more rack positions 716 of the archival data storage service 708 in order to free up power for the virtual computer system service 704. For example, if the virtual computer system service demands an additional 100KVA, the datacenter level scheduler may respond by decreasing the resource budgets 714 of 100 rack positions from 2KVA to 1KVA.

In a similar manner, the on-demand data storage service 706 may communicate power needs to the datacenter level scheduler 712. For example, if a customer of the computing resource service provider 702 utilizes on-demand data storage services in multiple data centers and one of the data centers becomes unavailable (e.g., due to extreme weather conditions or power outage), the customer may place more demand on the remaining one or more on-demand data storage services 706. In such a case, the on-demand data storage service 706 may communicate its need for additional power to the datacenter level scheduler 712, which, in turn, may assist in providing the additional power by reducing the resource budgets 714 for other services, such as the archival data storage service 708. As an example, the on-demand data storage service 706 may request 50KVA of power from the datacenter level scheduler 712, which, in turn, may reduce the resource budgets 714 of 100 of the rack positions 716 from 2KVA to 1.5KVA, thereby making 50KVA available to the on-demand data storage service 706. In a similar manner, the one or more other services 710 may communicate their resource needs to the datacenter level scheduler 712, and the datacenter level scheduler 712 may react accordingly.

The reverse condition may also occur; that is, the virtual computer system service 704 may notify the datacenter level scheduler 712 that it has a lull of activity and could spare 50KVA of power. In such a case, the datacenter level scheduler 712 may increase the resource budgets 714 of 100 rack positions from 2KVA to 2.5KVA, which may be useful to enable the 100 rack positions to catch up on work that may have been postponed during a period when the resource budgets 714 of the rack positions 716 had been decreased. Although the arrow from the resource budget 714 is shown in FIG. 7 as only flowing to the archival data storage service 708, it is contemplated as being within the scope of this disclosure that the datacenter level scheduler 712 may manage resource budgets 714 for any equipment for any type of service, including the distributed computer systems of the virtual computer system service 704, the on-demand data storage service 706, and the one or more other services 710 of the computing resource service provider 702.

Note too, that the datacenter level scheduler 712 may also apply more complex rules and conditions on when and how the resource budget 714 should be adjusted. For example, the datacenter level scheduler 712 may receive a request from one or more of the services 704-10 for additional power, but the datacenter level scheduler 712 may determine, based on the needs of the services it manages, that the resource budget 714 cannot safely or prudently be reduced, or at least not reduced by the amount requested by the one or more services 704-10. In such a case, the datacenter level scheduler 712 may communicate to the requesting service that the request was unable to be fulfilled.

Figure 8:
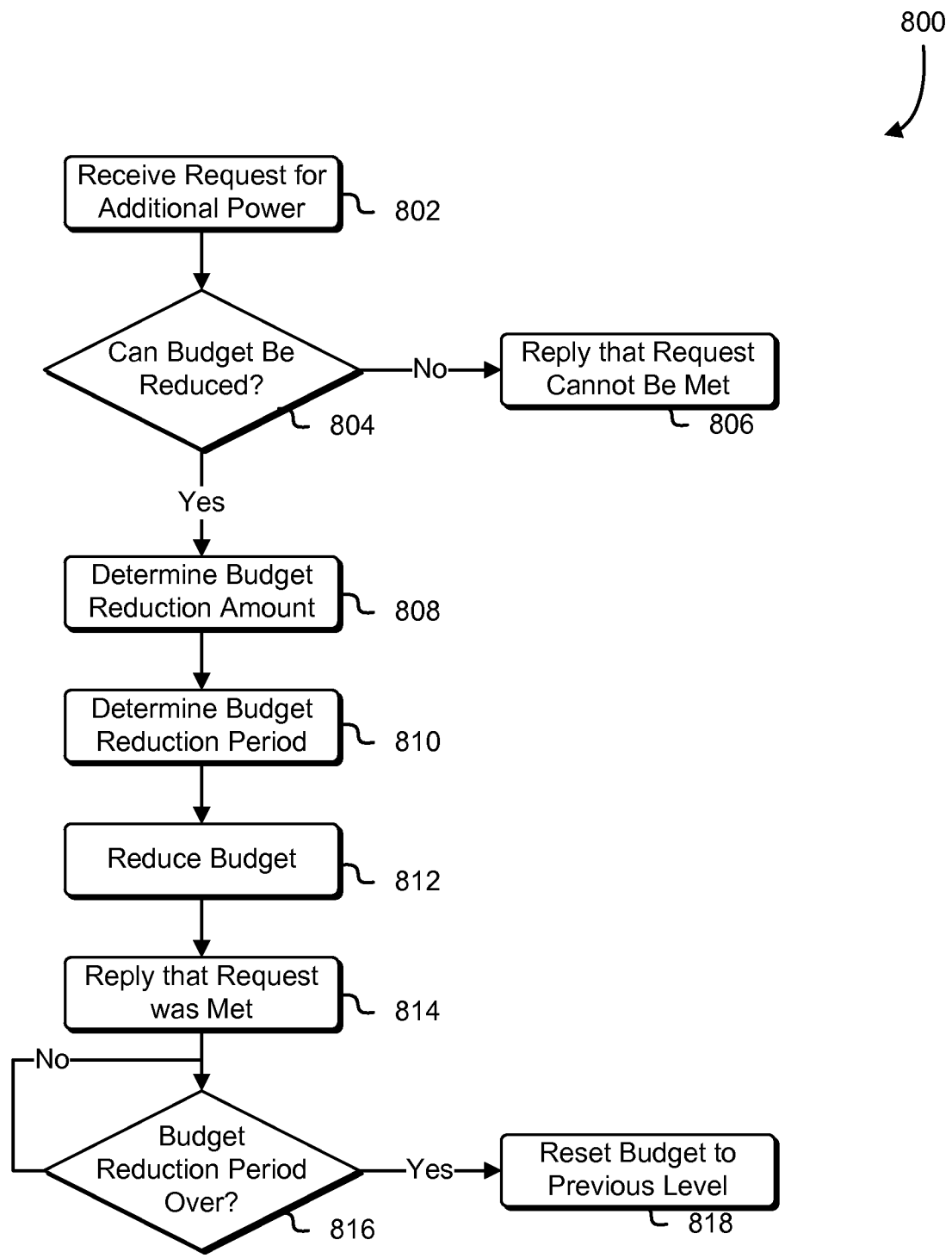
FIG. 8 is a flow chart that illustrates an example of adjusting power requirements based on input from services of a computing resource service provider in accordance with an embodiment.

FIG. 8 is a flow chart illustrating an example of a process 800 for reducing a resource budget in response to a resource need in accordance with various embodiments. The process 800 may be performed by any suitable system such as a server in a data center, by multiple computing devices in a distributed system of a computing resource service provider, or any electronic client device such as the electronic client device 1202 described in conjunction with FIG. 12. The process 800 includes a series of operations wherein a request is received by a datacenter level scheduler for additional power, a reduction amount and duration is determined, and one or more resource budgets are decreased for the duration.

In 802, a datacenter level scheduler receives a request for additional power. In some embodiments, the request may originate from a service of a computing resource service provider, however in some embodiments the request may be received from a customer of the computing resource service provider, such as if the customer would like to have additional power available or routed to servers of the computing resource service provider that host applications or data of the customer. In some of these cases, the computing resource service provider may charge the customer a premium for the extra power. In a flow not depicted by the process 800, in some embodiments a service or customer may grant additional power to be allocated by the datacenter level scheduler to one or more services for a period of time. In such cases, the computing resource service provider may provide a customer granting the additional power a discount or other reward in exchange for the grant of power.

In 804, the datacenter level scheduler determines whether the request for additional power can be met. In some cases, the datacenter level scheduler may review the systems and equipment it manages and determine that insufficient power can be spared to fulfill the request. For example, the systems may be scheduled to perform jobs required to meet a service-level agreement and a reduction in a resource budget for the systems would cause a failure to meet the service-level agreement. In such a case, the system performing the process 800 may proceed to 806, whereupon the datacenter level scheduler notifies the requestor that the request could not be fulfilled. In some cases, the datacenter level scheduler may determine that resource budgets may be reduced to free up additional power, but not as much additional power as requested. In such cases, the datacenter level scheduler may respond in several ways, such as by notifying the requestor that the requested amount of power could not be made available, notifying the requestor that some amount of power may be made available and reducing the resource budgets by that amount, or by querying the requestor whether an amount that the datacenter level scheduler determines could be made available would be acceptable.

In 808, a budget reduction amount is determined. The datacenter level scheduler may maintain one or more budgets that may apply to one or more servers or drive arrays, rack positions, groups of rack positions, or other equipment. If, for example, the datacenter level scheduler receives a request for 20KVA in additional power, the datacenter level scheduler may need to determine whether to reduce the resource budgets of 20 rack positions by 1KVA, reduce the resource budgets of 100 rack positions by 0.2KVA, or apply a set of criteria to determine which equipment resource budgets should be reduced and by how much. The criteria may involve evaluating the present power draw of the potentially-affected equipment, the present operations the equipment may be performing, priority levels of operations being performed, number of jobs in a job queue, and priority level of the jobs in the job queue. These and other factors may be considered to determine the particular budgets to reduce and their respective reduction amounts.

In 810, a budget reduction period is determined. In some cases, an amount of time that the additional power is needed may be specified in the request received in 802. It must be noted, as well, that the determination in 804 of whether the budget can be reduced, may further include a determination of whether the reduced budget can be reduced for the requested duration. In other cases, the resource budget may be reduced until the datacenter level scheduler is notified by the requestor that the need for additional power has ceased or until the equipment associated with the resource budget reduction has a need to have the power restored, whichever may come first. In still other cases, requests for additional power may be fulfilled for predetermined time periods, such as for a duration of one hour per request.

In 812, the resource budgets determined in 808 may be reduced by the determined amounts, and, in 814, the datacenter level scheduler may respond to the requestor that the determined amount of power has been freed and is available for use by the requestor. In some cases, this response may include a negotiation over a resource budget debt as described in the present disclosure. That is, the datacenter level scheduler may negotiate with the requestor for a time, duration and amount that the resource budget debt may be repaid to the equipment freeing up the requested power, so that such equipment may catch up on any work that may end up being postponed due to the resource budget restriction.

In 816, the data center resource scheduler may continuously poll to determine whether the duration of the resource budget reduction has ended. In some cases, this duration may be determined by checking a timer or clock against a predetermined or negotiated duration. In other cases, the data center resource scheduler may periodically query the requestor whether the need for additional power has ceased. In still other cases, such as if a system that has had its budget reduced has a need to reclaim the relinquished power, such as, for example, a need to perform work to remain in compliance with a service-level agreement, the system may notify the datacenter level scheduler of the situation, and the datacenter level scheduler may notify the requestor that the power is being reclaimed.

In any case, when the period of power reduction has ended, the system performing the process 800 may proceed to 818, whereupon the resource budgets of the equipment or systems affected by the resource budget reduction of 812 may be restored by the datacenter level scheduler. In some cases, the operations of 818 may include notifying the requestor that the duration of the request has ended and that the power is being reclaimed. Note that the operations performed in 802-18 may be performed in various orders and combinations, including in parallel.

FIG. 9 illustrates an aspect of an environment 900 in which an embodiment may be practiced. In an initial stage, FIG. 9 illustrates a data center 902 having a rack 904 with a resource budget 906A of 2KVA. In another stage, it may be that the outside temperature has increased to a point where cooling equipment 908 needs an additional 1KVA in order to keep the data center 902 cooled to an appropriate temperature. Note that a measurement of outside temperature is one of a variety of ways of determining that additional cooling power may be needed. Other examples include a measurement of temperatures of inside the data center or of an average of temperatures within one or more racks. In many systems, fan speeds of cooling fans increase as additional cooling is required; in some of these systems, a determination that cooling fan speed has exceeded or fallen below a certain number of rotations per minute may be sufficient to determine that more or less power is needed for the cooling equipment.

In the example, the resource budget 906B of the data center may be reduced to 1KVA to compensate for the additional power needed by the cooling equipment. It may be that the adjustment to the resource budget 906B may be made manually, programmatically, or according to one or more rules or conditions. In some cases, the resource budget 906B may remain at the reduced level until explicitly changed, whereas in some other cases, the resource budget may remain at the reduced level for a certain period of time (such as, for four hours during the hottest point of the day) or until certain conditions are met (e.g., the outside temperature drops below 80 degrees Fahrenheit, the cooling equipment 908 is detected as not needing as much power to keep the data center 902 cool, etc.).

It may be that, in exchange for allowing its resource budget 906B to be reduced, the datacenter level scheduler may allow the resource budget 906C of the rack 904 to be increased at a later stage. For example, at nighttime, when less power may be needed to cool the data center 902, the resource budget 906C may be increased to 3KVA for a certain period. Similar to the case of decreasing the resource budget 906B, the resource budget 906C may remain at the increased level until explicitly changed or may remain at the reduced level for a certain period of time (such as, from midnight to 4:00 AM) or until certain conditions are met (e.g., the outside temperature rises above 80 degrees Fahrenheit, the cooling equipment 908 is detected as not needing more power to keep the data center 902 cool, etc.).

Because some data storage services, such as archival data storage services, may have flexibility as to how soon requested jobs need to be completed, such jobs may be postponed or serviced less frequently, and, consequently, such data storage service may be able to operate at a reduced resource budget 906B (i.e., effectively reducing the number of hard drives and amount of other equipment that may be utilized) for a period of time. For example, different services of a computing resource service provider, such as archival data storage services, other data storage services and virtual computer system services, may be present within the same data center. It may be that, for a period, another of the services, such as the virtual computer system service, has need of additional power. In such a case, the datacenter level scheduler may be able to reduce the resource budget of less-urgent services, such as, for example, the archival data storage service, for the period of time. However, during that time, the job queue for such services may build up during the period of reduced budget, and allowing the data storage service to operate at an above-normal resource budget 906C at a later time may permit the data storage service to utilize additional drives in order to catch up on the accumulated jobs in the job queue. For example, the resource budget for the archival data storage service may be reduced from 2KVA per rack to 1KVA per rack for the time period, allowing the more urgent services to oversubscribe (i.e., increase their power utilization), and, later, when there may be excess capacity, the resource budget of the archival data storage service may be increased to 3KVA for an amount of time while it catches up with the job build up in its queue.

Note also, that while the resource budget and resource budget debt are described on a per rack level, it is also contemplated that the resource budget and resource budget debt may be managed at a per-system or per-equipment (e.g., hard drive, cooling fan, etc.) level for more fine-grained power management. Likewise, the resource budget and resource budget debt may be applied to groups of racks and/or other types of power-consuming equipment. Methods other than adjusting resource budgets are also contemplated to achieve similar benefits. For example, a computing resource service provider may provide a virtual machine service that offers spot instances to customers of the computing resource service provider (i.e., virtual machine instances having variable pricing and availability). In order to remain within a resource budget, unused spot instances may be shut down or priced higher with a goal to reduce overall power utilization during periods of peak demand for resources. Likewise, more spot instances may be made available or priced lower during periods of lower resource demand. Many other systems of a computing resource service provider, such as data warehousing services or data analytic services, may have a set of optional tasks that might be cooling or power intensive that could be configured to pause, shut down, or operate at a reduced rate, in order to reduce overall resource demand during periods of high demand or periods where cost savings may be achieved through reduced power utilization.

Resource budgets may be measured in other ways than units of power. Certain tasks for such services may have a lower priority and may be able to be postponed during periods of peak usage. In such embodiments, the resource budget may indicate a job priority level or a type of work to be done. For example, schedules for routine or periodic maintenance, like garbage collection, data compaction, data balancing and other anti-entropy operations, may be adjusted so that the maintenance tasks are executed during periods of low usage or low power rates. Similarly, in an archival data storage service, data may be temporarily stored in a staging area before being archived. In this example, such data may be kept in the staging area for a bit longer during periods of peak resource usage, and then, when resource usage decreases, the data may be moved from the staging area; e.g., the write load of the staging area may be turned off during the period of peak power usage.

Processor usage may be managed in a similar way. For example, it may be that a customer has services running at three data centers (e.g., for fault isolation purposes) that need to be able to operate at 90% peak (leaving a 10% cushion available for burst processing) processor utilization (i.e., capacity) during peak times (such as, for example, if a fault at one data center causes it to go offline), but, on average, the processors operate at 60% utilization (leaving a cushion of 40% for bursting). In this case, the resource budget may reflect, rather than a unit of power, a processing capacity budget. Thus, in times where a data center has a need to reduce power utilization, such as during a peak time, the processing capacity budget of the customer may be reduced during this time, and restored at a non-peak time or when the customer need is at a higher priority (e.g., in the case of a fault at one of the data centers). In some cases, a computing resource service provider may provide the customer with an incentive to allow such scaling down of the customer's budget, for example, in the form of a reduced usage cost to the customer for the respective services.

Figure 10:
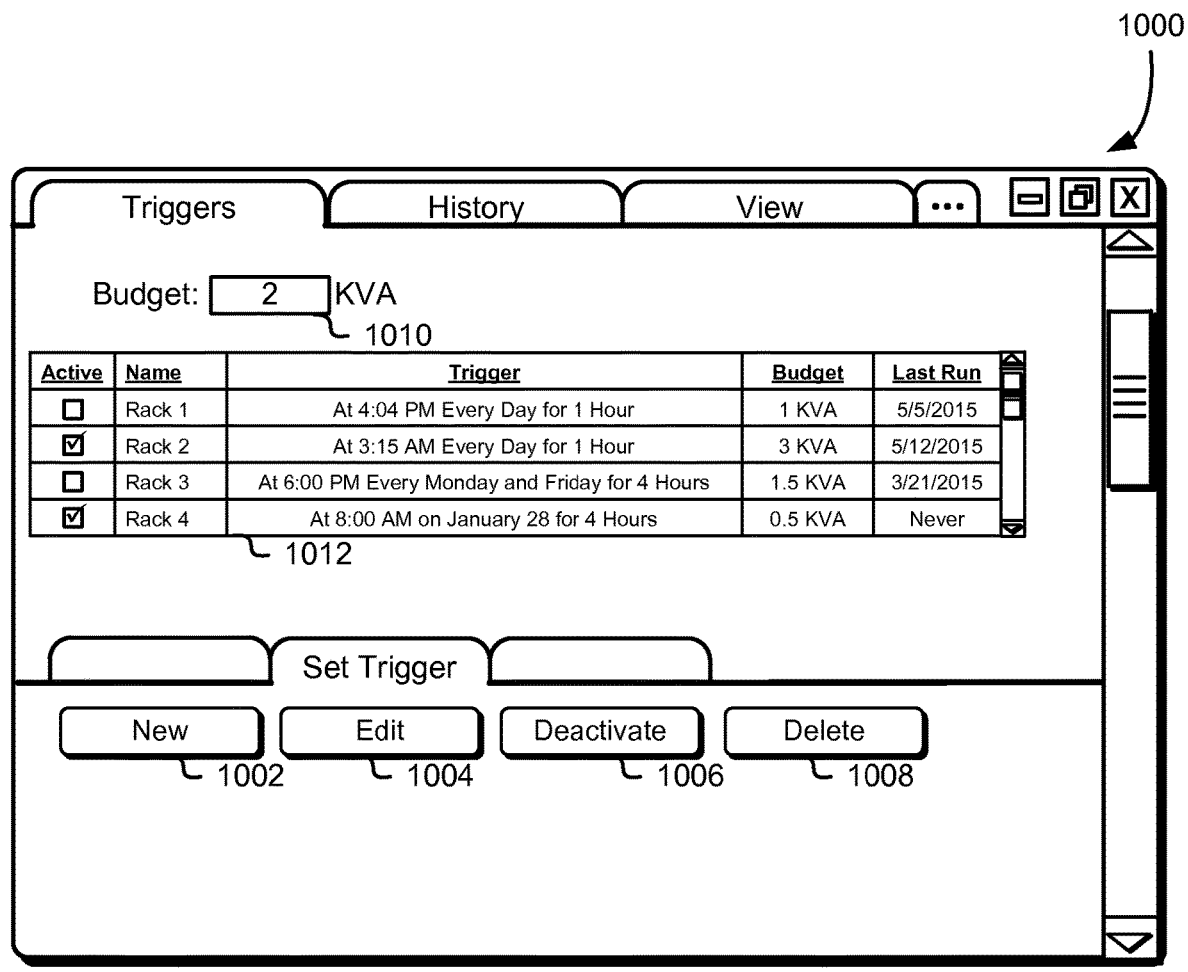
FIG. 10 illustrates an example of a user interface for adjusting resource budgets in accordance with an embodiment.

FIG. 10 illustrates an example user interface 1000 as may be used with an embodiment of the present disclosure. As illustrated in FIG. 10, the user interface 1000 may include clickable button icons for setting the various event triggers and resource budgets. For example, there may be a new button icon 1002 for causing a new event trigger entry to be created. There may be an edit button icon 1004 that may allow the user to modify existing event trigger entries. For example, the time, duration, or budget may need to be adjusted if certain conditions arise, such as unexpectedly hot weather, for example. There may be a deactivate button icon 1006 which may allow the user to temporarily or indefinitely suspend a particular event trigger entry. It may be desirable to deactivate an event trigger entry, rather than deleting the event trigger entry, if it is foreseeable that the event trigger entry may be used again in the future. Additionally or alternately, there may be a delete button icon 1008 for deleting obsolete or otherwise unneeded event trigger entries from the list.

The interface may further have a display field 1010 that displays the present or default resource budget. In some cases, the display field 1010 may be editable in order to adjust the resource budget manually. The user interface may have an event trigger list 1012 where present event triggers may be listed. In the example depicted as event trigger list 1012, various event trigger entries are listed and the equipment (e.g., the racks) with which the event trigger entries are associated. For example, an event trigger for "Rack 2" is indicated as being active and configured to run at 3:15 AM every day for one hour. During this hour, the resource budget for "Rack 2" would be set at 3KVA, which would be an increase from the default rack budget of 2KVA shown in the display field 1010. As another example, "Rack 3" is shown not to be active, indicating that the event trigger of "At 6:00 PM Every Monday and Friday for 4 Hours" will not be run. The event trigger list 1012 may additionally have a field showing the last time the event was triggered, which for "Rack 2" is indicated as being "May 12, 2015," and that the event for "Rack 4" has not yet been triggered ("Never"). Note that additional fields as would be known by a person having ordinary skill in the art may also be present; for example, the default resource budget as shown in the display field 1010, may be separate for each rack and the respective default resource budget may be shown in the event trigger list 1012 or may be viewable by side scrolling.

It should be noted that various other triggers might be possible. For example, one or more instruments measuring overall power consumption of various parts of the data center may be interfaced with the datacenter level scheduler, and a trigger could be set that automatically reduces the resource budget of one or more racks if the overall power utilization exceeds a predetermined amount. Likewise, a trigger could be set to increase a resource budget if the overall power utilization falls below a predetermined amount. A trigger could also be set to react if a cooling fan exceeds or falls below a certain power utilization or exceeds or falls below a certain number of rotations per minute. As another example, the datacenter level scheduler may be communicatively coupled to an instrument, such as a digital thermometer that measures outside temperature, and event triggers could be set based on temperature readings.

The vertical scroll bar on the event trigger list 1012 is meant to indicate that the list includes more event triggers than those visible in the view depicted in FIG. 10. Note too, that the racks listed by the user interface 1000 may be for a subset of racks in the data center or archival data storage service, such as a group of racks assigned to a particular customer, or, in other cases, may include all racks in the data center or archival data storage service. Note that access to such a user interface 1000 may available only to certain authorized users, such as technicians and engineers of an archival data storage service. In some cases, a customer may be able to set event triggers on racks and/or systems owned or leased by the customer. Furthermore, the user interface 1000 is meant for illustrative purposes only, and any variation of the user interface 1000 or any interface suitable for power management of the type described in the present disclosure as would be known by a person having ordinary skill in the art is contemplated as being within the scope of this disclosure. In some embodiments, the ability to set budgets, set event triggers, and query budget information of the datacenter level scheduler may be performed with remote procedure calls, application programming interface calls, web service calls, or other programmatic techniques without utilizing a user interface like the user interface 1000.

Rules regarding when and how the datacenter level scheduler may adjust resource budgets may be more complex than depicted in FIG. 10. For example, the datacenter level scheduler may be configured according to a rule that states that a set of equipment (which may be a set of one), such as racks, systems, or cooling equipment, may have its resource budget adjusted, but that its average resource budget over any 12-hour window must be a minimum of 1KVA. Further complexity may be added as well, such as a rule stating that a system may have its resource budget adjusted, but that its average resource budget over any 6-hour window must be a minimum of 1KVA, but that over any 48-hour window, its average resource budget must be a minimum of 1.5KVA. Thus, for such a rule, the system may have its resource budget decreased for a period of time, but, in exchange, would need to have its resource budget raised by a sufficient amount for a later period to erase the budget debt so as to satisfy the minimum resource budget rules.

As noted, the functionality depicted by the user interface 1000 may be applied, not just to individual racks, but also to sets of one or more racks or to an entire collection of systems of a service of a computing resource service provider. Likewise, the functionality depicted by the user interface 1000 may be configurable to implement resource budgets on a per-system, per-drive array, or per-hard drive level. Note too that, although the display field 1010 depicts a default budget, in various embodiments each device (i.e., rack, set of racks, system, or hard drive, etc.) may have its own separate resource budget. Furthermore, an interface such as the user interface 1000 may have functionality to associate a prioritization scheme with the one or more resource budgets. Some such prioritization schemes may be a prioritization level or rank, such that the resource budgets of certain devices are reduced before reducing the resource budgets of certain other devices. Some of these schemes may specify that the resource budgets of the certain devices must be reduced to a predetermined minimum level before the resource budgets of certain other devices may be reduced, whereas in other schemes, resource budgets of the devices may be reduced proportionally to their priority level or rank.

Some prioritization schemes may be rule-based, programmatically controlled, or may associate certain resource budgets with certain conditions; e.g., the datacenter level scheduler may be configurable to adjust priority based on time, date, season, temperature, or scheduled jobs. The prioritization may be dynamic and/or automated such that the prioritization of devices occurs with little or no user interaction. For example, racks which are currently executing write jobs may be considered higher priority than racks that are currently executing read jobs, and racks that are idle may be the lowest priority; in such a case, the datacenter level scheduler may automatically reduce the resource budgets of the idle racks before reducing the resource budgets on the reading racks, and the reading racks may have their resource budgets reduced before the resource budgets of the writing racks may be touched. Likewise, if the datacenter level scheduler is notified that excess capacity may be utilized by the devices, the higher-priority devices may be automatically allocated the excess capacity before the lower-priority devices are.

Figure 11:
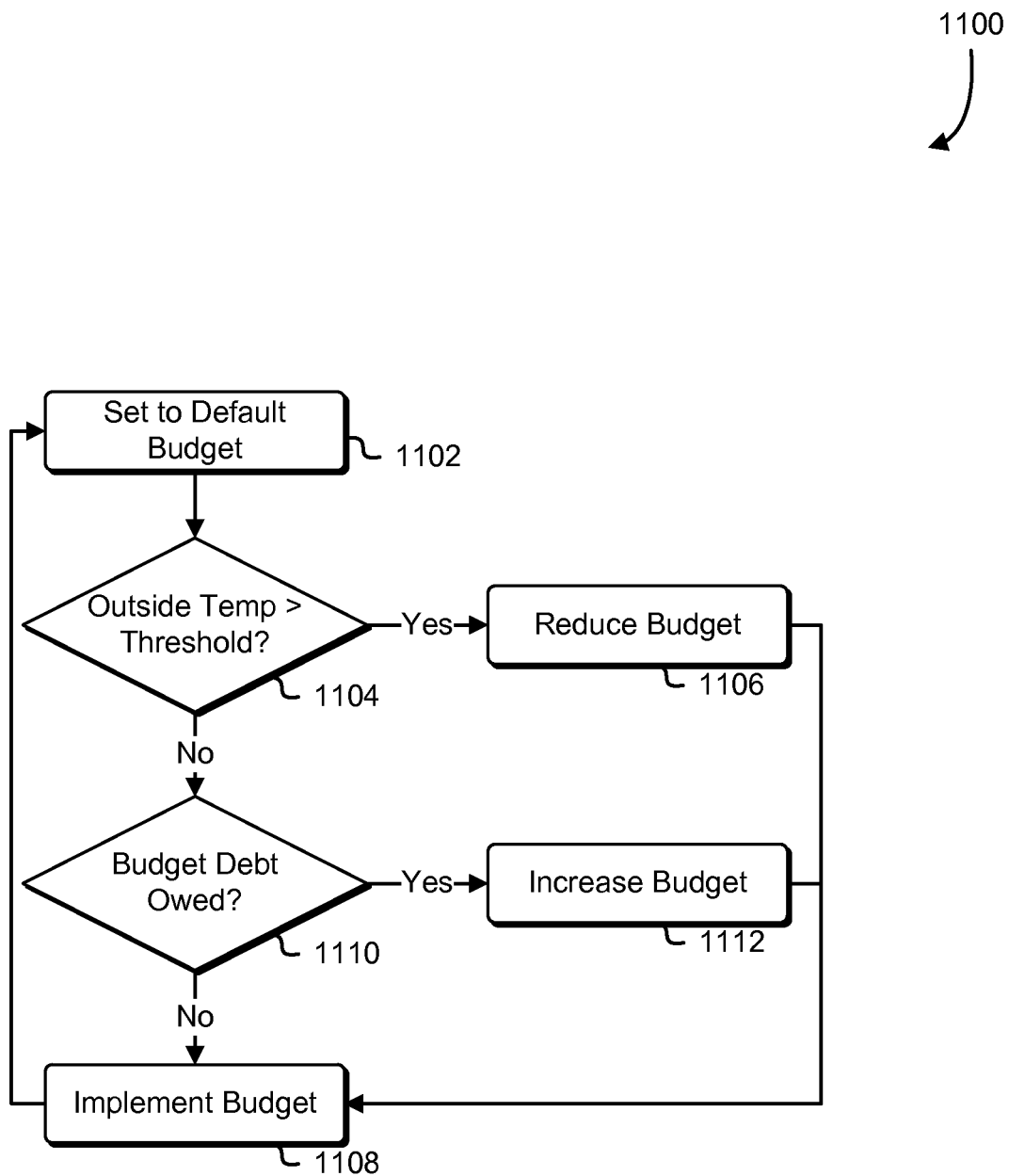
FIG. 11 is a flow chart that illustrates an example of adjusting resource budgets in accordance with an embodiment.

FIG. 11 is a flow chart illustrating an example of a process 1100 for adjusting a resource budget in response to a change in outside temperature in accordance with various embodiments. The process 1100 may be performed by any suitable system such as a server in a data center, by multiple computing devices in a distributed system of a computing resource service provider, or any electronic client device such as the electronic client device 1202 described in conjunction with FIG. 12. The process 1100 includes a series of operations wherein the outside temperature is sampled and a determination is made whether to adjust the default resource budget up or down. In 1102, the default budget for the equipment being managed is determined. As noted, the default budget may be a measure of power, such as kilovolt-ampere or watt, or may be a different unit of measurement for components of the equipment that has an effect on power utilization, such as processor utilization percentage or maximum number of active hard drives.

In 1104, the outside temperature is sampled and compared against a threshold. The outside temperature may be determined from, for example, a digital thermometer coupled to the datacenter level scheduler for measuring the outside temperature or from a weather website or rich site summary feed accessible through a network connection. The threshold may be a fixed threshold, such as 90 degrees Fahrenheit, may be based on an average historical figure (e.g., above/below the average fifth-hottest day of the year), or may be based at least in part on historical power utilization of the system (e.g., when the temperature is above/below a level that historically causes a 20% increase of power utilization by the data center).

In response to a determination that the outside temperature exceeds the threshold temperature, the system performing the process proceeds to 1106, whereupon the resource budget may be decreased from the default. The determination of how much to decrease the default resource budget may be based on various factors. In some cases, the amount to decrease may be a fixed amount, such as by 1KVA per rack. In some cases, there may be multiple threshold temperatures, and the amount of the decrease to the budget varies based on the threshold exceeded; for example, the budget decrease may be 0.5KVA per rack if the outside temperature exceeds 80 degrees Fahrenheit, 1KVA if the outside temperature exceeds 90 degrees Fahrenheit, and 1.75KVA if the outside temperature exceeds 100 degrees Fahrenheit. In other cases, the amount to decrease may be determined from a function that takes variables such as the present total power draw, power requirements for high-priority operations, and power requirements for low-priority operations, into account. In 1106, an amount of time to operate at the decreased budget may also be determined. As an example, it may be determined that the budget should be decreased for four hours during the hottest time of the day.

In 1108, the adjusted budget is implemented for the determined amount of time. The budget may be implemented by the system changing the present resource budget to the determined amount and performing the process 400 described regarding FIG. 4. At the end of the determined time, the system performing the process 1100 may return to 1102, whereupon the operations of 1102-12 may be repeated.

However, if the outside temperature does not exceed the threshold of 1104, the system performing the process 1100 may determine whether there is a power debt owed to the equipment being managed or whether there is excess capacity available. For example, during a hot portion of the day, the power utilization of the rack may have been limited to 1KVA. The datacenter level scheduler may be configured to allow the rack to operate at a higher budget for a period in exchange for the earlier decrease in the rack's resource budget. In some cases, the resource budget debt may be an equal or equivalent amount, in order that the average resource budget remains the same; e.g., if the resource budget had been decreased by 1KVA for four hours, the power debt may result in a subsequent increase in power by 1KVA for four hours, or a subsequent increase in power by 0.5KVA for eight hours, or the like. However, the time/subsequent increase does not necessarily need to equal the time/previous decrease, and in some cases the rack may be allowed to utilize excess power capacity as needed.

Note that FIG. 11 depicts a simplified example, and in some embodiments it may be that the temperature must drop a certain amount below the threshold temperature before the resource budget debt may be repaid. As an example, in a case where the resource budget is decreased when the outside temperature exceeds 80 degrees Fahrenheit, the system may also be configured to repay the budget debt only after the outside temperature decreases below 70 degrees Fahrenheit. Thus, if it is determined that a budget increase from default is owed, the increase may be increased in 1112 and implemented in 1108 for an amount of time determined in 1110. Note that the operations performed in 1102-12 may be performed in various orders and combinations, including in parallel.

Note that while the present disclosure has described the resource budget in terms of power utilization, the same techniques may be applied to other types of resources, such as network resources. Network demand in a data center may vary according to several factors. As an example, the network demand may be cyclical and may be driven by a demand from customers for data stored in the data center, and, as such, network demand may begin to increase in early morning as customers begin requesting data, peak at about mid-day, and then decrease to a low in the very early morning. Network demand may also be responsive to certain events, such as a sudden demand for a particular streaming video or equipment failure in the data center. In this environment, a resource budget may be assigned to the network resources of sets of equipment, such as one or more sets of racks, servers, and/or communication equipment in the data center, thereby setting constraints on network usage by the sets of equipment. For example, a server rack of, for example, an archival data storage service, may have a resource budget set to a default network bandwidth. A datacenter level scheduler may determine that the default network bandwidth of the server rack should be reduced during a period of peak network usage during the day and restored to default at an off-peak time. Likewise, the datacenter level scheduler may determine that a debt is owed to the system and may increase the network bandwidth of the server by increasing the resource budget bandwidth for a suitable time.

Note that, as with resource budgets for power utilization, resource budgets for network utilization may be manually and/or programmatically set, such as through a user interface similar to the user interface 1000. Event triggers could include restricting bandwidth if network usage exceeds a certain amount or if a certain amount of lag is detected on the network. The resource budget in terms of network utilization may also be applied to customers (e.g., some customers may opt-in to allow their network bandwidth to be temporarily reduced in exchange for a discount by the computing resource service provider) or customer requests (e.g., customers may tag certain job requests as being less urgent, thereby allowing data transfers associated with those job requests to be restricted in bandwidth by the computing resource service provider if needed in exchange for a discount). An advantage presented by being able to adjust network resources using the dynamic resource budget of the present disclosure may be to free up available bandwidth to allow a corresponding increase in bandwidth for other services on the network with urgent and/or temporary needs for such bandwidth.

Figure 12:
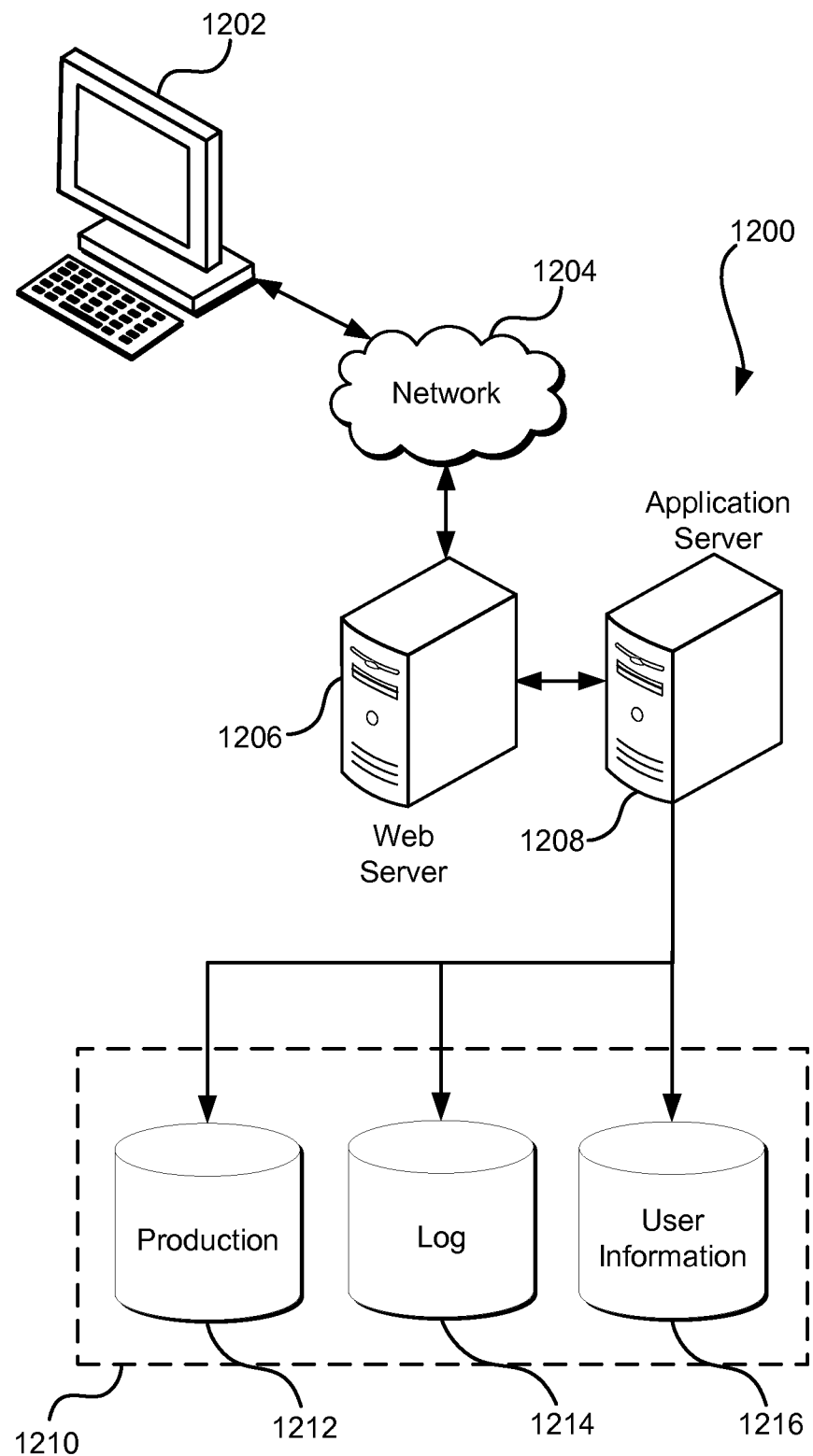
FIG. 12 illustrates an environment in which various embodiments can be implemented.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other network and/or combination thereof. Components used for such a system can depend at least in part upon the type of network and/or environment selected. Protocols and components for communicating via such a network are well known and will not be discussed in detail. Communication over the network can be enabled by wired or wireless connections and combinations thereof. In this example, the network includes the Internet, as the environment includes a web server 1206 for receiving requests and serving content in response thereto, although for other networks an alternative device serving a similar purpose could be used as would be apparent to one of ordinary skill in the art.

The illustrative environment includes an application server 1208 and a data store 1210. It should be understood that there could be several application servers, layers or other elements, processes or components, which may be chained or otherwise configured, which can interact to perform tasks such as obtaining data from an appropriate data store. Servers may be implemented in various ways, such as hardware devices or virtual computer systems. In some contexts, servers may refer to a programming module being executed on a computer system. Unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, forms that are perceptible to the user audibly, visually and/or through other senses including touch, taste, and/or smell. The handling of all requests and responses, as well as the delivery of content between the client device 1202 and the application server 1208, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code can be executed on any appropriate device or host machine as discussed elsewhere. Further, operations described as being performed by a single device may, unless otherwise clear from context, be performed collectively by multiple devices, which may form a distributed and/or virtual system.

The data store 1210 can include several separate data tables, databases, data documents, dynamic data storage schemes and/or other data storage mechanisms and media for storing data relating to a particular aspect of the present disclosure. For example, the data store illustrated may include mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic or a combination of static and dynamic data in response to the received instructions. Dynamic data, such as data used in web logs (blogs), shopping applications, news services and other such applications may be generated by server-side structured languages as described or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within an working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory.

The use of any examples, or exemplary language (e.g., "such as"), is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications and patents, cited are hereby incorporated by reference to the same extent as if each reference were individually and specifically indicated to be incorporated by reference and were set forth in its entirety.

What is claimed is:

1. A computer-implemented method, comprising:
   obtaining a power budget that constrains an amount of power available for utilization by a set of devices, wherein a subset of the set of devices performs a set of jobs scheduled from a job queue of a first service, the set of jobs respectively comprising a set of operations to be executed as a single unit, and wherein a subset of the set of jobs involves storage of data in a distributed data storage system, the power budget determined based at least in part on quantity of storage devices used to perform the set of operations of the set of jobs;
   receiving information that indicates a power demand of a set of other devices of a second service;
   determining a new power budget that constrains the amount of power available for utilization by the set of devices based at least in part on the information such that implementation of the new power budget would satisfy the power demand of the set of other devices; and
   updating the power budget to the new power budget such that operation of the set of devices in accordance with the new power budget causes a change in timing at which operations of one of the subset of jobs from the job queue in the set of jobs being performed by the subset of the set of devices is scheduled to begin.

2. The computer-implemented method of claim 1, wherein the information that indicates the power demand of the set of other devices includes an indication of an outdoor temperature.

3. The computer-implemented method of claim 1, wherein the information that indicates the power demand of the set of other devices includes a request for power for one or more services of a computing resource service provider.

4. The computer-implemented method of claim 1, wherein the change in timing involves scheduling, based at least in part on a state and respective power requirement for the state for each job in the job queue, which a set of unscheduled jobs in the job queue can be scheduled to be performed as scheduled jobs in the set of jobs without the set of devices exceeding the new power budget when the set of jobs is performed by the subset of the set of devices.

5. The computer-implemented method of claim 1, wherein the change in timing at which the one of the subset of jobs is scheduled to begin is a deferment in a scheduled timing for performing the one of the subset of jobs in the job queue.

6. A system, comprising:
   one or more processors; and
   memory including instructions that, as a result of execution by the one or more processors, cause the system to:
      obtain an amount of an available resource in a resource budget that constrains resource utilization by a set of devices; wherein a subset of the set of devices performs a set of jobs scheduled for a first service, the set of jobs respectively comprising a set of operations to be executed as a single unit, the resource budget determined based at least in part on hardware specifications of one or more storage devices used to perform the set of operations;
      receive information that indicates a resource need of a set of other devices of a second service that prompts the system to determine whether to adjust an amount of a resource available for utilization by the set of devices; and
      upon determining, based at least in part on the information, to adjust the amount of the resource available for utilization by the set of devices:
         determine a new resource budget that constrains resource utilization by the set of devices based at least in part on the information; and
         update the resource budget to the new resource budget such that operation of the set of devices in accordance with the new resource budget causes a change in timing at which one of the set of jobs is scheduled to begin.

7. The system of claim 6, wherein the information that prompts the system to determine whether to adjust the amount of the resource available for utilization by the set of devices includes the new resource budget, wherein the new resource budget is different from the resource budget.

8. The system of claim 6, wherein the information includes data that, when evaluated against a set of conditions, prompts the system to determine to adjust the amount of the resource available for utilization by the set of devices.

9. The system of claim 6, wherein the information that prompts the system to determine whether to adjust the amount of the resource available for utilization includes a request for an amount of a resource by one or more customers of a computing resource service provider, and wherein the request is received as a result of one or more application programming interface calls via an interface.

10. The system of claim 6, wherein the resource budget for constraining resource utilization is a power budget for constraining power utilization.

11. The system of claim 6, wherein the amount of the resource available for utilization by the set of devices reflects an amount of available network bandwidth and the resource budget is a network bandwidth budget for constraining network utilization for performing data storage services by the subset of the set of devices.

12. The system of claim 6, wherein the resource budget is a set of constraints on resource usage, wherein each constraint of the set of constraints corresponds to an amount of a resource available for a type of operation executable by the subset of the set of devices.

13. The system of claim 6, wherein the amount of the resource available for utilization by the set of devices reflects an amount of processor utilization capacity, the resource budget is a processor utilization budget for constraining peak processor utilization of processors in the set of devices, and constraining peak processor usage involves constraining peak utilization of the processors in the set of devices to a level less than full operational capacity.

14. The system of claim 6, wherein the set of devices includes a disk array of a data storage service.

15. A non-transitory computer-readable storage medium having stored thereon executable instructions that, as a result of execution by one or more processors of a computer system, cause the computer system to at least:
receive information that indicates a resource need of a set of other devices of a first service prompting a determination of whether to adjust a limit on an amount of a resource available for utilization at least in part by data storage operations by a set of devices of a second service, the data storage operations respectively comprising a set of operations to be executed as a single unit; and
as a result of the determination:
produce, based at least in part on the information, a resource budget that reflects an adjustment to the limit on the amount of the resource available for utilization at least in part by the data storage operations, the resource budget further determined based at least in part on a type of hardware operations of storage devices that execute the data storage operations; and
implement the resource budget such that a timing at which performance of one of the data storage operations is scheduled to begin is adjusted in accordance with the adjustment to the limit on the amount of the resource available for utilization.

16. The non-transitory computer-readable storage medium of claim 15, wherein the information prompting the determination comprises information indicating an excess capacity of a resource and the resource budget is produced such that the limit on the amount of the resource available for utilization at least in part by the data storage operations is increased in order to utilize at least a portion of the excess capacity.

17. The non-transitory computer-readable storage medium of claim 15, wherein the instructions that implement the resource budget further include instructions that, when executed by the one or more processors of the computer system, cause the computer system to schedule implementation of the resource budget for a future time.

18. The non-transitory computer-readable storage medium of claim 15, wherein the resource budget is a member of a set of resource budgets, and wherein each member of the set of resource budgets is allocated to a set of devices according to a prioritization scheme.

19. The non-transitory computer-readable storage medium of claim 15, wherein the resource budget is usable, at least in part, to determine whether a sufficient amount of the resource is available for a set of devices to perform one or more jobs.

20. The non-transitory computer-readable storage medium of claim 15, wherein:
the resource budget includes at least one lower resource limit and at least one duration; and
the resource budget is produced such that, when factored over the at least one duration, the limit on the amount of the resource available for utilization at least in part by the data storage operations does not fall below the at least one lower resource limit.

21. The non-transitory computer-readable storage medium of claim 20, wherein:
the at least one lower resource limit comprises a first lower resource limit and a second lower resource limit;
the at least one duration comprises a first duration and a second duration; and
the resource budget is produced such that, when factored over the first duration, the limit on the amount of the resource available for utilization does not fall below the first lower resource limit, and, when factored over the second duration, the limit on the amount of the resource available for utilization does not fall below the second lower resource limit.

* * * * *